(12) United States Patent
Fosback et al.

(10) Patent No.: US 9,076,176 B2
(45) Date of Patent: Jul. 7, 2015

(54) ELECTRONIC SUBMISSION OF APPLICATION PROGRAMS FOR NETWORK-BASED DISTRIBUTION

(75) Inventors: Jason Robert Fosback, Edmonds, WA (US); Ricardo D. Cortes, Los Gatos, CA (US); Max Muller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 848 days.

(21) Appl. No.: 12/286,092

(22) Filed: Sep. 26, 2008

(65) Prior Publication Data

US 2009/0276433 A1 Nov. 5, 2009

Related U.S. Application Data

(60) Provisional application No. 61/059,792, filed on Jun. 8, 2008, provisional application No. 61/050,478, filed on May 5, 2008.

(51) Int. Cl.
  G06F 17/30 (2006.01)
  G06F 7/00 (2006.01)
  G06Q 30/06 (2012.01)

(52) U.S. Cl.
  CPC .................................. *G06Q 30/0603* (2013.01)

(58) Field of Classification Search
  CPC .......... G06F 17/3012; G06F 17/30109; G06F 17/301; G06F 17/3089; H04L 67/2804
  USPC .......................... 707/821, 758, 697, 899, 948
  See application file for complete search history.

(56) References Cited

U.S. PATENT DOCUMENTS

| | | | |
|---|---|---|---|
| 4,750,119 A | 6/1988 | Cohen et al. |
| 5,253,165 A | 10/1993 | Leiseca et al. |
| 5,535,383 A | 7/1996 | Gower |
| 5,627,973 A | 5/1997 | Armstrong et al. |
| 5,752,128 A | 5/1998 | Yamashita |

(Continued)

FOREIGN PATENT DOCUMENTS

| | | |
|---|---|---|
| EP | WO02/097620 | 12/2002 |
| EP | 1 684 223 A1 | 7/2006 |

(Continued)

OTHER PUBLICATIONS

"Liquifier Pro 4.0 for Windows™ User's Guide," 1998, Liquid Audio, Inc.

(Continued)

*Primary Examiner* — Jeffrey A Burke
(74) *Attorney, Agent, or Firm* — Novak Druce Connolly Bove + Quigg LLP

(57) ABSTRACT

An improved system and method for submitting, distributing and/or managing digital products with respect to a product distribution site are disclosed. The submission of digital products to the product distribution site is able to be performed by numerous submitters in a uniform and computer-assisted manner. The submitted digital products can then be managed in a largely automated manner and made available for online purchase and distribution at the product distribution site. Once a digital product is submitted, the user can access the status of the digital product submission to obtain information of whether the digital product has been approved or rejected. In one embodiment, the digital products are computer program products (e.g., computer software programs).

12 Claims, 36 Drawing Sheets

(56) References Cited

U.S. PATENT DOCUMENTS

| | | | |
|---|---|---|---|
| 5,765,152 A | 6/1998 | Erickson | |
| 5,884,280 A | 3/1999 | Yoshioka et al. | |
| 6,067,531 A | 5/2000 | Hoyt et al. | |
| 6,085,253 A | 7/2000 | Blackwell et al. | |
| 6,151,643 A | 11/2000 | Cheng | |
| 6,226,618 B1 | 5/2001 | Downs et al. | |
| 6,233,682 B1 | 5/2001 | Fritsch | |
| 6,263,313 B1 | 7/2001 | Milsted | |
| 6,275,954 B1 | 8/2001 | Herman et al. | |
| 6,338,044 B1 | 1/2002 | Cook et al. | |
| 6,341,353 B1 | 1/2002 | Herman et al. | |
| 6,345,256 B1 | 2/2002 | Milsted et al. | |
| 6,363,486 B1 | 3/2002 | Knapton | |
| 6,381,742 B2 * | 4/2002 | Forbes et al. | 717/176 |
| 6,385,596 B1 | 5/2002 | Wiser et al. | |
| 6,389,592 B1 | 5/2002 | Ayres et al. | |
| 6,546,555 B1 | 4/2003 | Hjelsvold et al. | |
| 6,549,922 B1 | 4/2003 | Srivastava et al. | |
| 6,587,837 B1 | 7/2003 | Spagna et al. | |
| 6,591,420 B1 | 7/2003 | McPherson et al. | |
| 6,658,476 B1 | 12/2003 | Van | |
| 6,691,149 B1 | 2/2004 | Yokota et al. | |
| 6,731,312 B2 | 5/2004 | Robbin | |
| 6,754,895 B1 | 6/2004 | Bartel et al. | |
| 6,873,992 B1 | 3/2005 | Thomas | |
| 6,874,003 B2 | 3/2005 | Morohashi | |
| 6,910,049 B2 | 6/2005 | Fenton et al. | |
| 6,938,005 B2 | 8/2005 | Iverson et al. | |
| 7,073,193 B2 | 7/2006 | Marsh | |
| 7,076,445 B1 | 7/2006 | Cartwright | |
| 7,168,012 B2 | 1/2007 | Clauss et al. | |
| 7,209,892 B1 | 4/2007 | Galuten et al. | |
| 7,275,243 B2 | 9/2007 | Gibbons et al. | |
| 7,292,980 B1 * | 11/2007 | August et al. | 704/254 |
| 7,308,413 B1 | 12/2007 | Tota et al. | |
| 7,328,049 B2 * | 2/2008 | Chanut | 455/574 |
| 7,383,233 B1 | 6/2008 | Singh et al. | |
| 7,506,053 B1 * | 3/2009 | Qin | 709/225 |
| 7,624,046 B2 | 11/2009 | Galuten et al. | |
| 7,653,552 B2 * | 1/2010 | Vaidyanathan et al. | 705/1.1 |
| 7,685,512 B2 | 3/2010 | Hanson et al. | |
| 7,729,946 B2 | 6/2010 | Chu | |
| 7,739,256 B2 * | 6/2010 | Powell | 707/705 |
| 7,756,920 B2 | 7/2010 | Muller et al. | |
| 7,826,829 B2 * | 11/2010 | Pousti | 455/414.1 |
| 7,827,162 B2 | 11/2010 | Suitts et al. | |
| 7,835,720 B2 * | 11/2010 | Pousti | 455/406 |
| 7,844,548 B2 | 11/2010 | Robbin et al. | |
| 7,860,830 B2 | 12/2010 | Mirrashidi et al. | |
| 7,962,634 B2 | 6/2011 | Cortos et al. | |
| 8,015,237 B2 | 9/2011 | Muller et al. | |
| 2001/0021926 A1 | 9/2001 | Schneck et al. | |
| 2001/0037207 A1 | 11/2001 | Dejaeger | |
| 2001/0044786 A1 | 11/2001 | Ishibashi | |
| 2001/0054046 A1 | 12/2001 | Mikhailov et al. | |
| 2002/0002541 A1 | 1/2002 | Williams | |
| 2002/0032658 A1 | 3/2002 | Oki et al. | |
| 2002/0047899 A1 | 4/2002 | Son et al. | |
| 2002/0049844 A1 | 4/2002 | Nishikawa | |
| 2002/0073177 A1 | 6/2002 | Clark et al. | |
| 2002/0077986 A1 | 6/2002 | Kobata et al. | |
| 2002/0078211 A1 | 6/2002 | Natarajan et al. | |
| 2002/0082857 A1 | 6/2002 | Skordin et al. | |
| 2002/0087440 A1 | 7/2002 | Blair et al. | |
| 2002/0091584 A1 | 7/2002 | Clark et al. | |
| 2002/0099661 A1 | 7/2002 | Kii et al. | |
| 2002/0099696 A1 | 7/2002 | Prince | |
| 2002/0099801 A1 | 7/2002 | Ishii | |
| 2002/0107795 A1 * | 8/2002 | Minear et al. | 705/40 |
| 2002/0107803 A1 | 8/2002 | Lisanke et al. | |
| 2002/0112171 A1 | 8/2002 | Ginter et al. | |
| 2002/0116293 A1 | 8/2002 | Lao et al. | |
| 2002/0124182 A1 | 9/2002 | Bacso et al. | |
| 2002/0143612 A1 | 10/2002 | Barik et al. | |
| 2002/0143782 A1 | 10/2002 | Headings et al. | |
| 2002/0152267 A1 | 10/2002 | Lennon | |
| 2002/0152278 A1 | 10/2002 | Pontenzone et al. | |
| 2002/0165811 A1 | 11/2002 | Ishii et al. | |
| 2002/0186844 A1 | 12/2002 | Levy et al. | |
| 2002/0198843 A1 | 12/2002 | Wang et al. | |
| 2003/0005173 A1 | 1/2003 | Shah et al. | |
| 2003/0037242 A1 | 2/2003 | Yasuna et al. | |
| 2003/0065717 A1 | 4/2003 | Saito et al. | |
| 2003/0074465 A1 | 4/2003 | Tang et al. | |
| 2003/0115144 A1 | 6/2003 | Stefik et al. | |
| 2003/0120593 A1 | 6/2003 | Bansai et al. | |
| 2003/0120928 A1 | 6/2003 | Cato et al. | |
| 2003/0135424 A1 | 7/2003 | Davis et al. | |
| 2003/0149742 A1 | 8/2003 | Bollerud | |
| 2003/0182188 A1 | 9/2003 | Duchow | |
| 2003/0225701 A1 | 12/2003 | Lee et al. | |
| 2003/0236886 A1 | 12/2003 | Oren et al. | |
| 2004/0012618 A1 | 1/2004 | Finney | |
| 2004/0015427 A1 | 1/2004 | Camelio | |
| 2004/0015445 A1 | 1/2004 | Heaven | |
| 2004/0034601 A1 | 2/2004 | Kreuzer | |
| 2004/0039754 A1 * | 2/2004 | Harple, Jr. | 707/104.1 |
| 2004/0043753 A1 * | 3/2004 | Wake et al. | 455/406 |
| 2004/0044949 A1 | 3/2004 | Rowe | |
| 2004/0059929 A1 | 3/2004 | Rodgers et al. | |
| 2004/0133605 A1 | 7/2004 | Chang et al. | |
| 2004/0136698 A1 | 7/2004 | Mock et al. | |
| 2004/0143760 A1 | 7/2004 | Alkove et al. | |
| 2004/0148598 A1 | 7/2004 | Kita et al. | |
| 2004/0153968 A1 | 8/2004 | Ching et al. | |
| 2004/0158546 A1 * | 8/2004 | Sobel et al. | 707/1 |
| 2004/0167858 A1 | 8/2004 | Erickson | |
| 2004/0181459 A1 | 9/2004 | Wright | |
| 2004/0181591 A1 * | 9/2004 | Yu et al. | 709/217 |
| 2004/0205028 A1 | 10/2004 | Verosub et al. | |
| 2004/0210481 A1 | 10/2004 | Quinlan et al. | |
| 2004/0215733 A1 | 10/2004 | Gondhalekar et al. | |
| 2004/0254883 A1 | 12/2004 | Kondrk et al. | |
| 2004/0254949 A1 | 12/2004 | Amirthalingam | |
| 2004/0267552 A1 | 12/2004 | Gilliam et al. | |
| 2004/0267608 A1 | 12/2004 | Mansfield Jr. | |
| 2004/0268451 A1 | 12/2004 | Robbin et al. | |
| 2005/0015765 A1 | 1/2005 | Covell et al. | |
| 2005/0021478 A1 | 1/2005 | Gautier et al. | |
| 2005/0033774 A1 | 2/2005 | Brentano et al. | |
| 2005/0034164 A1 | 2/2005 | Sano et al. | |
| 2005/0038813 A1 | 2/2005 | Apparao et al. | |
| 2005/0050218 A1 | 3/2005 | Sheldon et al. | |
| 2005/0050345 A1 | 3/2005 | Dowdy et al. | |
| 2005/0080743 A1 | 4/2005 | Ostrover et al. | |
| 2005/0080788 A1 | 4/2005 | Murata | |
| 2005/0144635 A1 | 6/2005 | Boortz | |
| 2005/0165656 A1 * | 7/2005 | Frederick et al. | 705/26 |
| 2005/0182792 A1 | 8/2005 | Israel et al. | |
| 2005/0197946 A1 * | 9/2005 | Williams et al. | 705/36 |
| 2005/0216472 A1 | 9/2005 | Leon et al. | |
| 2005/0240529 A1 | 10/2005 | Thomas | |
| 2005/0267894 A1 | 12/2005 | Camahan | |
| 2005/0278375 A1 | 12/2005 | Mitchko et al. | |
| 2005/0283394 A1 | 12/2005 | McGloin et al. | |
| 2005/0289047 A1 * | 12/2005 | Oliver et al. | 705/39 |
| 2006/0008256 A1 | 1/2006 | Khedouri et al. | |
| 2006/0015463 A1 * | 1/2006 | Gupta et al. | 705/52 |
| 2006/0015489 A1 | 1/2006 | Probst et al. | |
| 2006/0041748 A1 | 2/2006 | Lockhart et al. | |
| 2006/0048132 A1 | 3/2006 | Chen et al. | |
| 2006/0062426 A1 | 3/2006 | Levy et al. | |
| 2006/0074754 A1 * | 4/2006 | Toyohara et al. | 705/14 |
| 2006/0107046 A1 | 5/2006 | Raley et al. | |
| 2006/0112101 A1 | 5/2006 | Young | |
| 2006/0143264 A1 * | 6/2006 | Payne et al. | 709/203 |
| 2006/0161604 A1 | 7/2006 | Lobo | |
| 2006/0167751 A1 | 7/2006 | Maruyama | |
| 2006/0167816 A1 | 7/2006 | Wang et al. | |
| 2006/0212722 A1 | 9/2006 | Ginter et al. | |
| 2006/0229929 A1 * | 10/2006 | Hughes | 705/9 |
| 2006/0242640 A1 * | 10/2006 | Pauly et al. | 717/174 |
| 2006/0272026 A1 | 11/2006 | Niwano et al. | |
| 2006/0277096 A1 | 12/2006 | Levitus | |

(56) References Cited

U.S. PATENT DOCUMENTS

| | | |
|---|---|---|
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0050467 A1* | 3/2007 | Borrett et al. ............... 709/213 |
| 2007/0073694 A1 | 3/2007 | Picault et al. |
| 2007/0083471 A1 | 4/2007 | Robbin et al. |
| 2007/0106522 A1 | 5/2007 | Collins |
| 2007/0108274 A1 | 5/2007 | Boardman et al. |
| 2007/0133609 A1 | 6/2007 | Moore et al. |
| 2007/0180490 A1* | 8/2007 | Renzi et al. ............... 726/1 |
| 2007/0192352 A1 | 8/2007 | Levy |
| 2007/0208670 A1 | 9/2007 | Quoc |
| 2007/0220051 A1* | 9/2007 | Brentano et al. .......... 707/104.1 |
| 2007/0233604 A1 | 10/2007 | Larson et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2007/0294089 A1 | 12/2007 | Garbow et al. |
| 2008/0040379 A1 | 2/2008 | Suitts et al. |
| 2008/0071614 A1 | 3/2008 | Mebruer |
| 2008/0120199 A1 | 5/2008 | Pirnack et al. |
| 2008/0133594 A1* | 6/2008 | Fotinatos et al. .......... 707/104.1 |
| 2008/0140493 A1 | 6/2008 | DeAngelis |
| 2008/0140537 A1* | 6/2008 | Powell ............... 705/26 |
| 2008/0147530 A1 | 6/2008 | Kwan et al. |
| 2008/0147558 A1 | 6/2008 | Kraus |
| 2008/0155552 A1 | 6/2008 | Kim |
| 2008/0195651 A1 | 8/2008 | Rachmiel et al. |
| 2008/0249946 A1 | 10/2008 | Candelore |
| 2008/0288405 A1 | 11/2008 | John |
| 2008/0301058 A1* | 12/2008 | Campbell et al. ............... 705/80 |
| 2009/0037287 A1* | 2/2009 | Baitalmal et al. ............... 705/26 |
| 2009/0063543 A1 | 3/2009 | Martin et al. |
| 2009/0138117 A1 | 5/2009 | Bagwell et al. |
| 2009/0198830 A1 | 8/2009 | Zhang et al. |
| 2009/0240552 A1* | 9/2009 | Yang et al. ............... 705/9 |
| 2009/0259502 A1 | 10/2009 | Erlewine et al. |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0307201 A1 | 12/2009 | Dunning et al. |
| 2009/0307682 A1 | 12/2009 | Gharabally |
| 2009/0307683 A1* | 12/2009 | Gharabally ............... 717/173 |
| 2010/0060776 A1 | 3/2010 | Topliss et al. |
| 2010/0115443 A1 | 5/2010 | Richstein |
| 2010/0205274 A1 | 8/2010 | Gharabally et al. |
| 2010/0235254 A1 | 9/2010 | Mirrashidi et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |

FOREIGN PATENT DOCUMENTS

| | | |
|---|---|---|
| EP | 2 230 620 A1 | 9/2010 |
| JP | 2003036396 A | 7/2001 |
| JP | 2003241845 A | 2/2002 |
| JP | 2003333133 A | 5/2002 |
| JP | 2004171360 A | 6/2004 |
| KR | 10-2007-0000739 | 1/2007 |
| KR | 10-2008-0009589 | 1/2008 |
| WO | WO 97/04410 | 2/1997 |
| WO | WO 98/49644 | 11/1998 |
| WO | WO 00/08909 | 2/2000 |
| WO | WO 02/48920 | 6/2002 |
| WO | WO 2004/019182 A2 | 3/2004 |

OTHER PUBLICATIONS

Radified Guide to Ripping & Encoding CD Audio, http://mp3.radified.com, downloaded Oct. 7, 2003, pp. 1-5.

"Music Collector Features," Collectorz.com music collector features, http://www.collectorz.com/music/features.php, downloaded Oct. 7, 2003, pp. 1-2.

"Gracenote CDDB," Gracenote, product webpage, http://www.gracenote.com/gn_products/cddb.html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc. http://www.avcataloger.com/Products.aspx, downloaded Oct. 6, 2003, pp. 1-4.

Jyri Huopaniemi, "Music Encoding and Transmission," CUIDAD meeting, ICMC 2000 Berlin, Aug. 28, 2000.

"Media Encoding FAQ," Loudeye Corp., http://www.loudeye.com/digitalmedia/solutions/mediaenchost/encodingfaq.asp, downloaded Oct. 9, 2003, pp. 1-3.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

Sonopress Global Network User Manual, Client Tools, Upload Data/Graphics Files to Sonopress, Sonopress, date unknown.

MPEG-7 Multimedia Description Schemes XM (Version 2.0), ISO/IEC, Mar. 2000, pp. 1-138.

"Digital Audio Best Practices Version 2.1", by Digital Audio Working Group, Oct. 2006, http:/www.mndigital.org.digitizing/standards/audio.pdf.

"Media encoding datasheet," Loudeye Corp., http://www.loudeye.com/digitalmedia/solutions/mediaenchost/encoding.asp, downloaded Oct. 9, 2003, pp. 1-4.

"Media hosting datasheet," Loudeye Corp. http://www.loudeye.com/digitalmedia/solutions/mediaenchost/hosting.asp, downloaded Oct. 9, 2003, pp. 1-2.

Examiner's First Report for Australian Patent Application No. 2009244432, dated Sep. 23, 2011.

Cortes, Ricardo D. et al., "Electronic Submission and Management of Digital Products for Network-Based Distribution", 8802.318. PCKR01 Second Preliminary Rejection, Application No. 2012-7022159, Filed May 5, 2009, dated Aug. 29, 2013., Sep. 13, 2012, 41 pages.

Fosback, Jason R. et al., "Electronic Submission of Application Programs for Network-Based Distribution", 8802.317.PCCA00 Examination report, Application No. 2723373, Filed May 5, 2009, Dated Mar. 26, 2013, pp. 1-4.

Fosback, Jason R. et al., "Electronic Submission of Application Programs for Network-Based Distribution", 8802.317.PCCN00, Second Office Action, Application No. 200980123614.6, Filed May 5, 2009, Dated Apr. 28, 2013, pp. 1-34.

Miller II, Stanley A., "All that iWish for on my iPhone," Wilwaukee, Wisconsin, Journal Sentinel, Mar. 16, 2008, downloaded from http://www.jsonline.com/business/29487929.html, pp. 1-4.

* cited by examiner

ELECTRONIC SUBMISSION OF APPLICATION PROGRAMS FOR NETWORK-BASED DISTRIBUTION

CROSS-REFERENCE TO RELATED APPLICATION

This application claims priority to: (ii) U.S. Provisional Patent Application No. 61/059,792, filed Jun. 8, 2008, entitled "ELECTRONIC SUBMISSION OF APPLICATION PROGRAMS FOR NETWORK-BASED DISTRIBUTION", which is hereby incorporated herein by reference; and (ii) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

This application also references and/or incorporates: (i) U.S. Provisional Patent Application No. 61/059,791, filed Jun. 8, 2008, entitled "NETWORK-BASED UPGRADE OF APPLICATION PROGRAMS", which is hereby incorporated herein by reference; and (ii) U.S. Provisional Patent Application No. 61/059,790, filed Jun. 8, 2008, entitled "NETWORK-BASED DISTRIBUTION OF APPLICATION PRODUCTS", which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to submission of digital products and, more particularly, to electronic submission of digital products for purposes of network-based distribution.

2. Description of the Related Art

Today, online media stores, such as iTunes™ Media Store, allow customers (i.e., online users) to purchase or rent media items, such as music or videos, over the Internet. Often, at online media stores, numerous media items made available and are provided by various different content providers, such as music labels or movie companies. Software tools, such as iProducer™ and Label Connect™ available from Apple Inc. of Cupertino, Calif., can assist content providers with online submission of media content to the iTunes™ Media Store.

Software programs are also available to purchased or licensed at retail stores as well as online stores. Conventionally, a software program is primarily purchased as a compact disc (CD) containing the software program. Alternatively, purchasers can often purchase and download a software program from an online retailer or a software provider's website. However, when an online retailer operates to sell software programs of various independent parties, there are difficulties in providing the digital program files and supporting information/files to the online retailers. This problem is exacerbated by a large number of small software providers that often desire to partner with the online retailer. As a result, online retailers that receive online submissions face substantial burdens and difficulties due to the wide range of variation with respect to the submissions. Submission of larger-sized software program also creates not only system challenges but also potential complications for users.

Therefore, there is a need for improved approaches to facilitate submission of software programs to online retailers.

SUMMARY OF THE INVENTION

The invention relates to an improved system and method for submitting, distributing and/or managing digital products with respect to a product distribution site. The submission of digital products to the product distribution site is able to be performed by numerous submitters in a uniform and computer-assisted manner. The submitted digital products can then be managed in a largely automated manner and made available for online purchase and distribution at the product distribution site. Once a digital product is submitted, the user can access the status of the digital product submission to obtain information of whether the digital product has been approved or rejected. In one embodiment, the digital products are computer program products (e.g., computer software programs).

In one embodiment, the invention pertains to a method and system for controlled submission of digital products in a client-server environment. The controlled submission can assist user in properly submitting digital products and can use user accounts to restrict unauthorized access. Users can be verified and data to be submitted can be validated before submission is permitted. Following submission, the digital product submitted can be evaluated for quality control. Although at least a portion of the quality control can be automated, manual review of submissions can still be performed prior to distribution of the digital products from the product distribution site. Additionally, once a digital product has been submitted, a submitter can access the status of the submission online and can also resubmit some or all of the components of a prior submission in the event that the earlier submission is deemed deficient. The product distribution site can also be referred to as an online product hosting site.

The invention can be implemented in numerous ways, including as a method, system, device, apparatus (including computer readable medium and graphical user interface). Several embodiments of the invention are discussed below.

As a method for submitting an application program to an online repository, one embodiment of the invention can, for example, include at least: authenticating a user; determining if the user is approved for submission of application programs to the online repository; determining whether there are any eligible application programs for upload by the user to the online repository provided that the user has been authenticated and approved for submission of application programs; and receiving a submission of an application program file for a selected one or more of the eligible application programs.

As a method for submitting an application program to an online repository, another embodiment of the invention can, for example, include at least: receiving login information for a user; displaying an indication that the user has been verified and approved for submission of application programs to an online repository; subsequently displaying a list of one or more application programs that are eligible for upload by the user to the online repository; receiving a selection of at least one of the application program in the list of the one or more application programs; specifying an electronic application program file to correspond to the at least one selected application program; and initiate uploading of the specified electronic application program file to the online repository.

As a computer readable medium including at least executable computer program code tangibly stored thereon for submitting an application program to an online repository, one embodiment of the invention can, for example, include at least: computer program code for authenticating a user; computer program code for determining if the user is approved for submission of application programs to the online repository; computer program code for determining whether there are any eligible application programs for upload by the user to the online repository provided that the user has been authenticated and approved for submission of application programs; and computer program code for receiving a submission of an application program file for a selected one or more of the eligible application programs.

As a computer readable medium including at least executable computer program code tangibly stored thereon for submitting an application program to an online repository, another embodiment of the invention can, for example, include at least: computer program code for receiving login information for a user; computer program code for displaying an indication that the user has been verified and approved for submission of application programs to an online repository; computer program code for displaying a list of one or more application programs that are eligible for upload by the user to the online repository, computer program code for receiving a selection of at least one of the application program in the list of the one or more application programs; computer program code for specifying an electronic application program file to correspond to the at least one selected application program; and computer program code for initiating upload of the specified electronic application program file to the online repository.

Other aspects and advantages of the invention will become apparent from the following detailed description taken in conjunction with the accompanying drawings which illustrate, by way of example, the principles of the invention.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The invention will be readily understood by the following detailed description in conjunction with the accompanying drawings, wherein like reference numerals designate like elements, and in which.

DETAILED DESCRIPTION OF THE INVENTION

The invention relates to an improved system and method for submitting, distributing and/or managing digital products with respect to a product distribution site. The submission of digital products to the product distribution site is able to be performed by numerous submitters in a uniform and computer-assisted manner. The submitted digital products can then be managed in a largely automated manner and made available for online purchase and distribution at the product distribution site. Once a digital product is submitted, the user can access the status of the digital product submission to obtain information of whether the digital product has been approved or rejected. In one embodiment, the digital products are computer program products (e.g., computer software programs).

In one embodiment, the invention pertains to a method and system for controlled submission of digital products in a client-server environment. The controlled submission can assist user in properly submitting digital products and can use user accounts to restrict unauthorized access. Users can be verified and data to be submitted can be validated before submission is permitted. Following submission, the digital product submitted can be evaluated for quality control. Although at least a portion of the quality control can be automated, manual review of submissions can still be performed prior to distribution of the digital products from the product distribution site. Additionally, once a digital product has been submitted, a submitter can access the status of the submission online and can also resubmit some or all of the components of a prior submission in the event that the earlier submission is deemed deficient. The product distribution site can also be referred to as an online product hosting site.

Embodiments of various aspects of the invention are discussed below with reference to FIGS. 1-16B. However, those skilled in the art will readily appreciate that the detailed description given herein with respect to these figures is for explanatory purposes as the invention extends beyond these limited embodiments.

Figure 1:
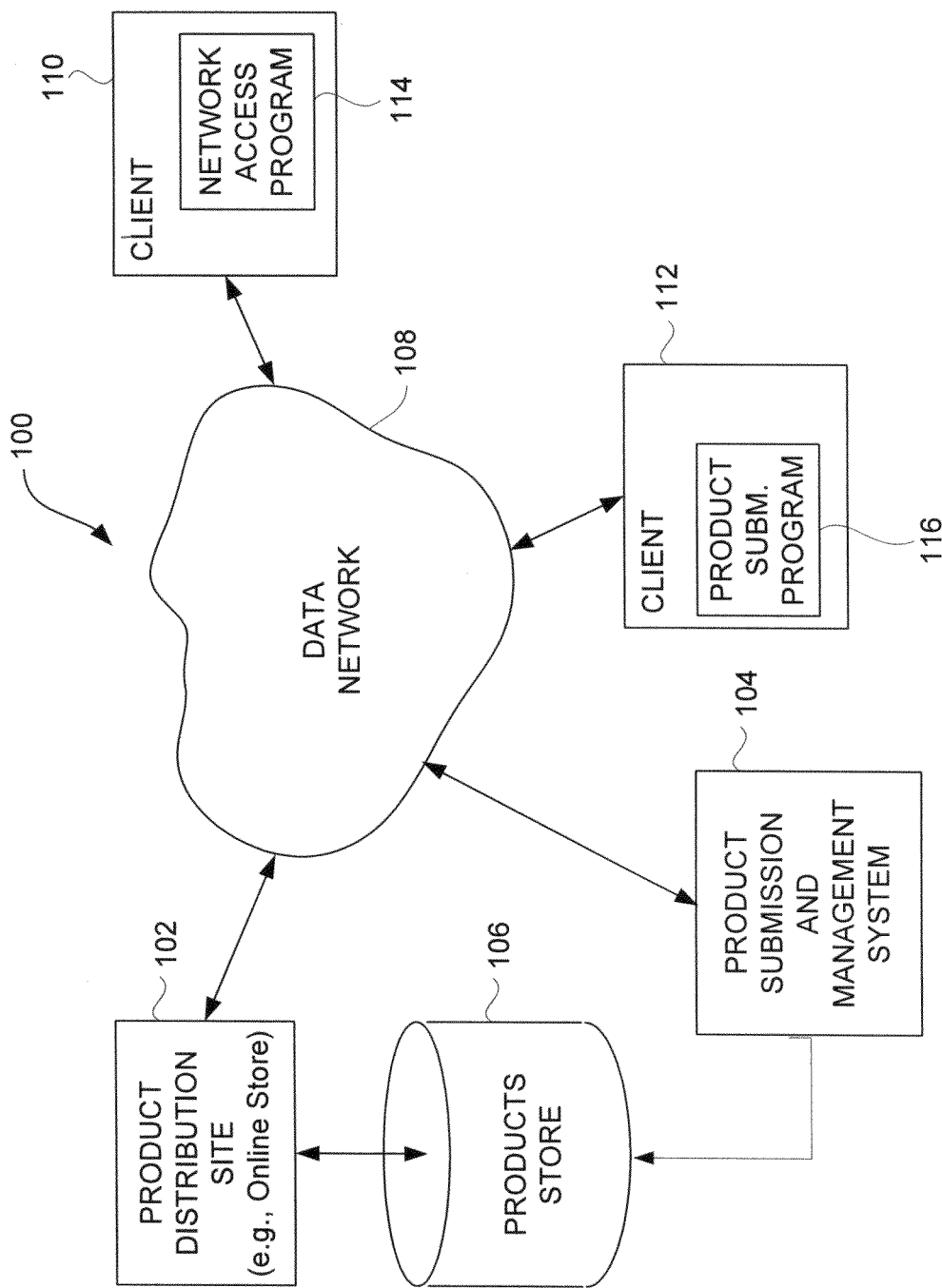
FIG. 1 is a block diagram of a product submission and distribution system according to one embodiment of the invention.

FIG. 1 is a block diagram of a product submission and distribution system 100 according to one embodiment of the invention. The product submission and distribution system 100 includes a product distribution site 102. The product distribution site 102 provides an online access point for distribution of various digital products. For example, the product distribution site 102 can be referred to as an online store. A product submission and management system 104 operates to receive submissions of digital products from various digital product submitters. The product submission and management system 104 can process submission of digital products and authorize distribution of approved digital products. The digital products can be stored in a products store 106. In one embodiment, the products store 106 includes a mass data store and one or more databases. The products store 106 provides mass storage of the numerous digital products that are available for distribution (e.g., purchase or rental). For example, digital products that have been purchased can be accessed from the products store 106 over a data network 108 by way of the product distribution site 102. Examples of digital products are computer program products such as applications (or application programs), animations, or presentations.

The product submission and distribution system 100 also includes a first client 110 and a second client 112. Typically, the product submission and distribution system 100 would include a plurality of different clients 110, 112. The first client 110 includes a network access program 114. The second client 112 includes a product submission program 116. Some clients can also include both the network access program 114 and the product submission program 116. The network access program 114 is an application program (e.g., software application) that operates on the first client 110, which is a computing device. One example of a suitable network access program is a network browser (e.g., Microsoft Explorer or Safari). Another example of a suitable network access program is iTunes™ offered by Apple Inc. The first client 110 is coupled to the product distribution site 102 through the data network 108. Hence, any of the first clients 110 can interact with the product distribution site 102 to review, purchase and/or manage digital products.

The product submission program 116 is also an application program (e.g., software application) that operates on the second client 112, which is a computing device. The product submission program 116 is used to submit digital products to the product submission and management system 104 for eventual distribution by the media distribution site 102. Although the network access program 114 and the product submission program 116 are shown in FIG. 1 as separate programs, it should be understood that such programs can be integrated into a single program or reside on the same client machine.

In the product submission and distribution system 100 shown in FIG. 1, the digital products are submitted to the product submission and management system 104 by way of the product submission program 116. The digital products that have been submitted (e.g., via the second client 112 are processed and then stored in the products store 106. Thereafter, the stored digital products are available to be purchased from the product distribution site 102. Upon purchasing a particular digital product, the product distribution site 102 permits the digital data for the particular digital product to be retrieved from the products store 106 and then delivered (e.g., downloaded) from the product distribution site 102 to the requesting client 110 through the data network 108. In this regard, the product distribution site 102 or some other delivery server (not shown) obtains the digital data corresponding to the particular digital product from the products store 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital product at the client 110.

The product submission and distribution system 100 allows a user of the client 110 to utilize the network access program 114 to browse, search or sort through a plurality of digital products that can be purchased from the product distribution site 102. The network access program 114 may also allow the user to preview or demo some or all of a digital product. In the event that the user of the network access program 114 desires to purchase a particular digital product, the user (via the network access program 114) and the product distribution site 102 can engage in an online commerce transaction in which the user pays for access rights to the particular digital product. In one embodiment, a credit card associated with the user is credited for a purchase or rental amount of the particular digital product.

The submission and purchase of the digital products can be achieved over the data network 108. In other words, the submission and purchase of the digital products can be achieved online. The purchase of media items online can also be referred to as electronic commerce (e-commerce). In one embodiment, the data network 108 includes at least a portion of the Internet. The clients 110, 112 can vary with application but generally are computing devices that have memory storage. Often, the clients 110, 112 are personal computers or other computing devices that are capable of storing and presenting media to their users. In one embodiment, the connections through the data network 108 between the product distribution site 102 and the clients 110, 112 can be through secure connections, such as Secure Sockets Layer (SSL).

Although the product distribution site 102, the product submission and management system 104 and the products store 106 are shown in FIG. 1 as being separate components, it should be understood that any of these components can be combined into one or more apparatus. For example, the product submission and management system 104 can be incorporated into the product distribution site 102. As another example, the products store 106 can be incorporated into the product distribution site 102 or the product submission and management system 104.

Figure 2:
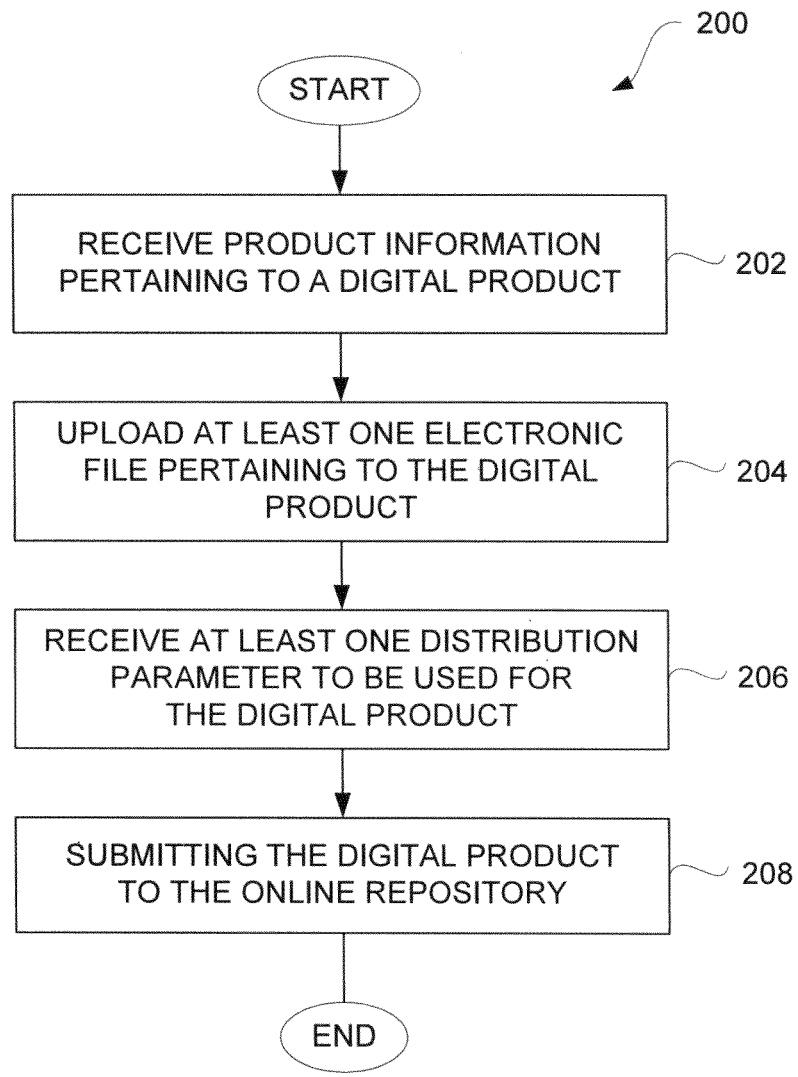
FIG. 2 is a flow diagram of a digital product submission process according to one embodiment of the invention.

FIG. 2 is a flow diagram of a digital product submission process 200 according to one embodiment of the invention. The digital product submission process 200 can, for example, be performed by a client device, such as the client 114, or a server device, such as the product submission and management system 104.

The digital product submission process 200 can receive 202 product information pertaining to a digital product. The product information can vary depending upon the type of digital product being submitted. In one implementation, one type of digital product that can be submitted to an online repository by the digital product submission process 200 is a digital program product, such as a computer program product. Examples of product information for a computer program product can include one or more of: a product name, a supported device type indication, genre indication, version number, product identifier, support information, and license agreement information.

Next, a least one electronic file pertaining to a digital product can be uploaded 204. The digital product can have one or more electronic files associated therewith. For example, the digital product may include a binary file, a support or help file, and/or one more exemplary screen illustrations.

In addition, a least one distribution parameter to be used with the digital product can be received 206. A distribution parameter is a parameter that can be utilized to control or influence the manner in which the digital product is able to be distributed. One example of a distribution parameter is a pricing parameter. As an example, a pricing parameter can specify a price or a price tier to be associated with the digital product. Other distribution parameters can pertain to digital storefronts from which the digital product is to be distributed from. Still further, distribution parameters could also pertain to preview eligibility, license categories (types), etc.

Thereafter, the digital product can be submitted 208 to the online repository. The online repository can, for example, correspond to the product submission and management system 104. The online repository can receive the one or more electronic files, the associated product information and the one or more distribution parameters. The online repository can then operate to permit distribution of the digital product, as contained in the one or more electronic files, from a product distribution site (e.g., an online store) in accordance with the product information and the one or more distribution parameters. After the submission 208 of the digital product to the online repository, the digital product submission process 200 can end.

Figure 3:
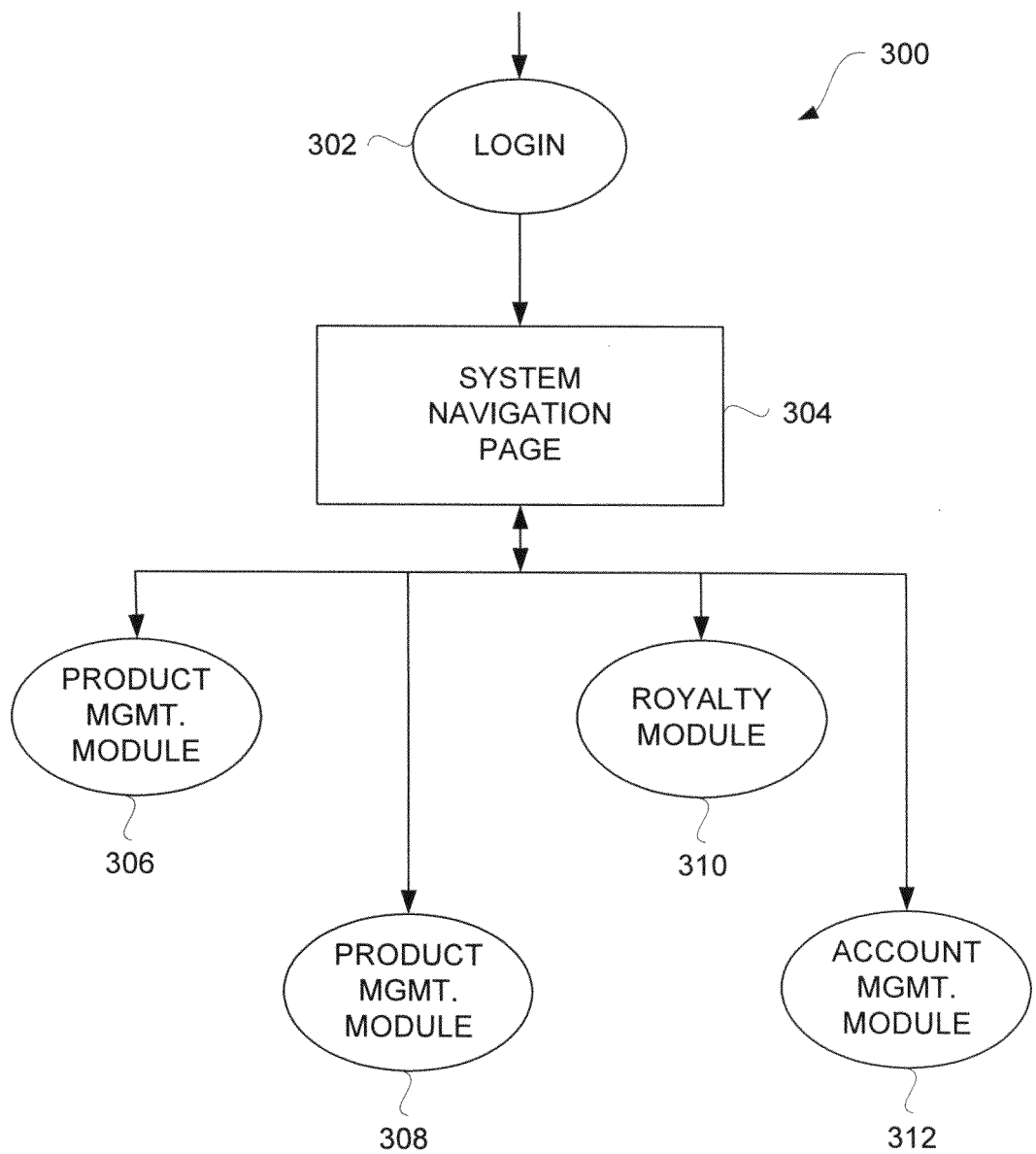
FIG. 3 is a block diagram of a product submission and management system according to one embodiment of the invention.

FIG. 3 is a block diagram of a product submission and management system 300 according to one embodiment of the invention. The product submission and management system 300 can, for example, represent one embodiment of the product submission and management system 104 illustrated in FIG. 1.

The product submission and management system 300 can require a login 302. For example, the login can require a user (i.e., digital product submitter) to provide a user name and a password. If the digital product submitter has successfully logged into the product submission and management system 300, the digital product submitter can be presented with a system navigation page 304. From the system navigation page 304, the digital product submitter can access one or more modules that are supported by the product submission and management system 300. According to one embodiment, as illustrated in FIG. 3, the modules supported by the product submission and management system 300 can include a product management module 306, a contract request module 308, a royalty module 310, and an account management module 312.

The product management module 306 can allow the digital product submitter to submit new products and control distribution of such new products. The product management module 306 can also allow the digital product submitter to edit previous submissions. The contract request module 308 can permit the digital product submitter to request a contract with an entity that provides the product distribution. Such a contract can enable the digital products submitter to distribute digital products using a product distribution site (e.g., online store) provided by the entity. The royalty module 310 can assist the digital product submitter in monitoring distribution of all digital products associated with the digital product submitter, including monitoring royalties that will or have in provided to the digital submitter due to distribution of such digital products. For example, the digital product submitter can access monthly royalty reports. The account management module 312 can provide centralized account management for the digital products, including, for example, access permissions, email settings, basic account information to be associated with the digital products matter.

Figure 4:
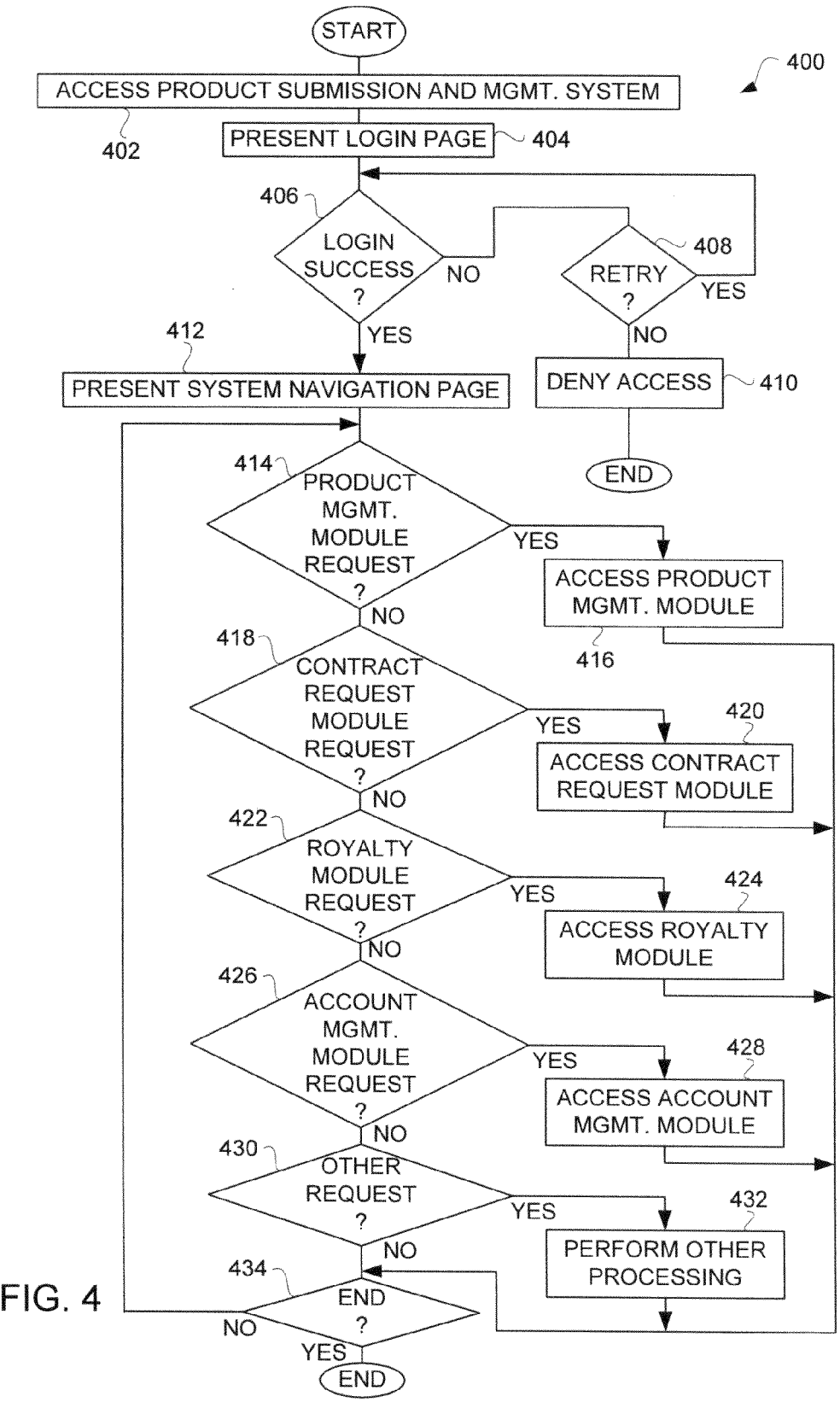
FIG. 4 is a flow diagram of a product submission and management process according to one embodiment of the invention.

FIG. 4 is a flow diagram of a product submission and management process 400 according to one embodiment of the invention. The product submission and management process 400 can, for example, be performed by a product submission and management system. In this embodiment, it is assumed that the product submission and management system is the product submission and management system 300 illustrated in FIG. 3.

The product submission and management process 400 can begin by accessing 402 the product submission and management system. A login page can then be presented 404 to the user seeking to submit a digital product to the product submission and management system. The user can then enter a user name and password. Thereafter, a decision 406 can determine whether login has been successfully achieved. When the decision 406 determines that login has not been successful, a decision 408 can determine whether a retry for the login is permitted. When the decision 408 determines that a retry is not permitted, access to the product submission and management system is denied 410. Following block 410, the product submission and management process can end. Alternatively, when the decision 408 determines that a retry is permitted, the product submission and management process 400 can return to repeat the decision 406 so that another login attempt can be permitted.

When the decision 406 determines that login has been successfully achieved, a system navigation page can be presented 412. From the system navigation page, a plurality of different software modules can be accessed. In the embodiment illustrated in FIG. 4, the software modules include a product management module, a contract request module, a royalty module and an account management module. The user can interact with the system navigation page to activate any of these different software modules. More particularly, the processing associated with activating any the different modules is discussed below.

After the system navigation page has been presented 412, a decision 414 can determine whether a product management module request has been received. When the decision 414 determines that a product management module request has been received, a product management module can be accessed 416. On the other hand, when the decision 414 determines that a product management module request has not been received, a decision 418 can determine whether a request for access to the contract request module has been received. When the decision 418 determines that a request to access the contract request module has been received, a contract request module can be accessed 420. Alternatively, when the decision 418 determines that a request to access the contract request module has not been received, a decision 422 can determine whether a royalty module request has been received. When the decision 422 determines that a royalty module request has been received, a royalty module can be accessed 424. On the other hand, when the decision 422 determines that a royalty module request has not been received, a decision 426 can determine whether an account management module request has been received. When the decision 426 determines that an account management module request has been received, an account management module can be accessed 428.

On the other hand, when the decision 426 determines that an account management module request has not been received, a decision 430 can determine whether some other request from the user has been received. When the decision 430 determines that some other request has been received, other processing can be performed 432.

Following each of the blocks 416, 420, 424, 428 and 432 as well as following the decision 430 when some other request has not been received, a decision 434 can determine whether the product submission and management process 400 should end. When the decision 434 determines that the product submission and management process 400 should not end, the processing returns to perform the decision 414 and subsequent blocks so that subsequent user requests can be processed. However, when the decision 434 determines that the product submission and management process 400 should end, the product submission and management process 400 can end.

Figure 5:
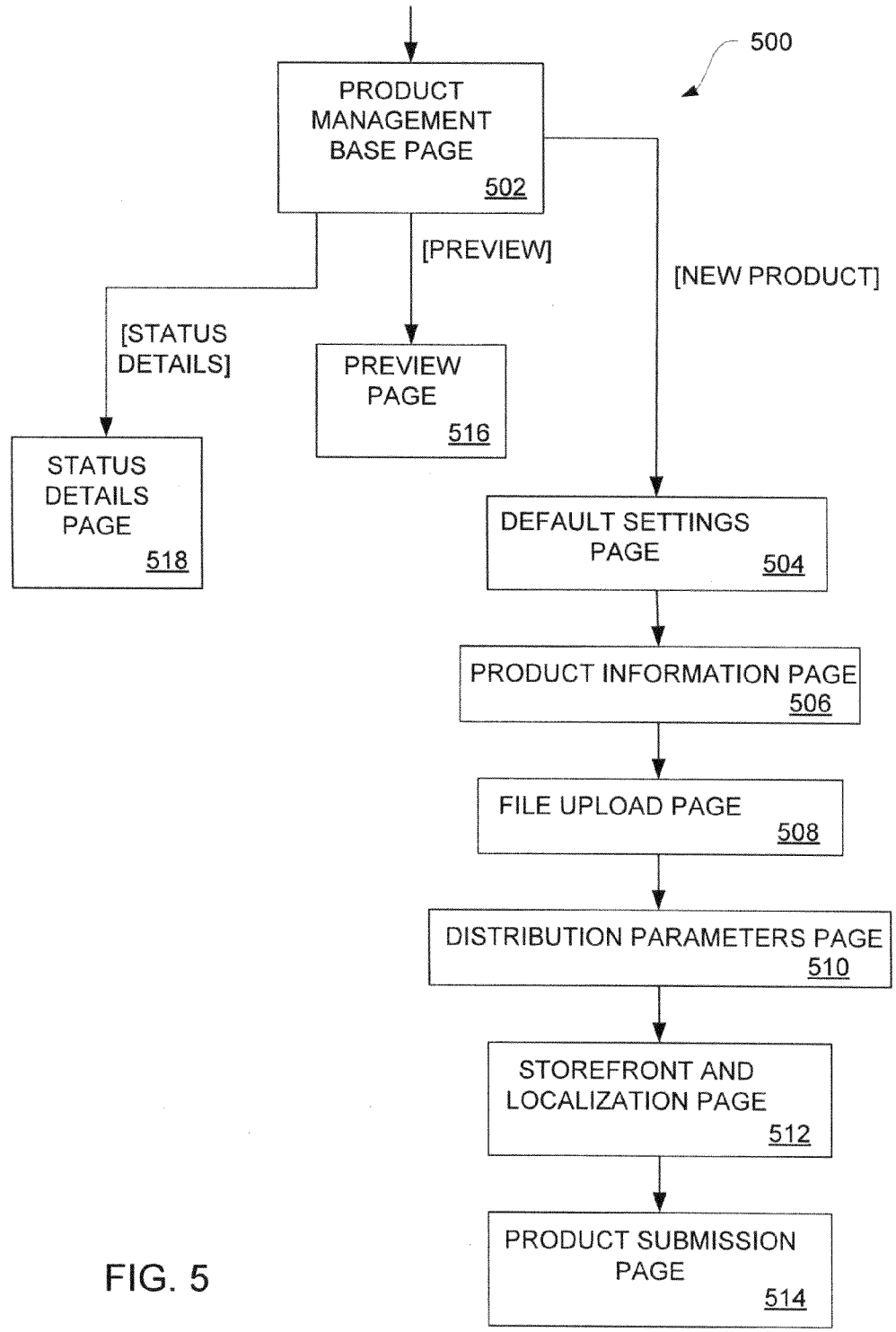
FIG. 5 is a block diagram of a project management system according to one embodiment of the invention.

FIG. 5 is a block diagram of a project management system 500 according to one embodiment of the invention. The project management system 500 includes a product management base page 502. From the project management base page 502 a user can navigate to different pages to facilitate (i) addition of a new product to the project management system 500, (ii) preview of product representations for distribution, and/or (iii) review of status details pertaining to one or more products.

When the user interacts with the product management base page 502, a default setting page 504 can be presented. The default setting page 504 allows the user to configure default settings. Following the default setting page 504, a product information page 506 can be presented. The product information page 506 allows a user to enter product information pertaining to a new product. Following the product information page 506, a file upload page 508 can be presented. The file upload page 508 allows the user to specify digital files to be uploaded and associated with the new product. Following the file upload page 508, a distribution parameters page 510 can be presented. The distribution parameters page 510 allows the user to enter various parameters that affect distribution, such as pricing information. Following the distribution parameters page 510, a storefront and localization page 512 can be presented. The storefront and localization page 512 can allow the user to specify all or certain storefronts from which the new product is to be available for distribution (e.g., purchase). Also, to the extent that some of such storefronts are in geographically different regions of the world, the localization information can also be provided by the user. For example, the localization information can provided foreign language versions of some of the product information. Following the storefront and localization page 512, a product submission page 514 can be presented. The product submission page can allow the user to confirm data that has been provided for the new product and then cause the submission of such information to a product submission and management system, such as the product submission and management system 104 illustrated in FIG. 1.

Figure 6A:
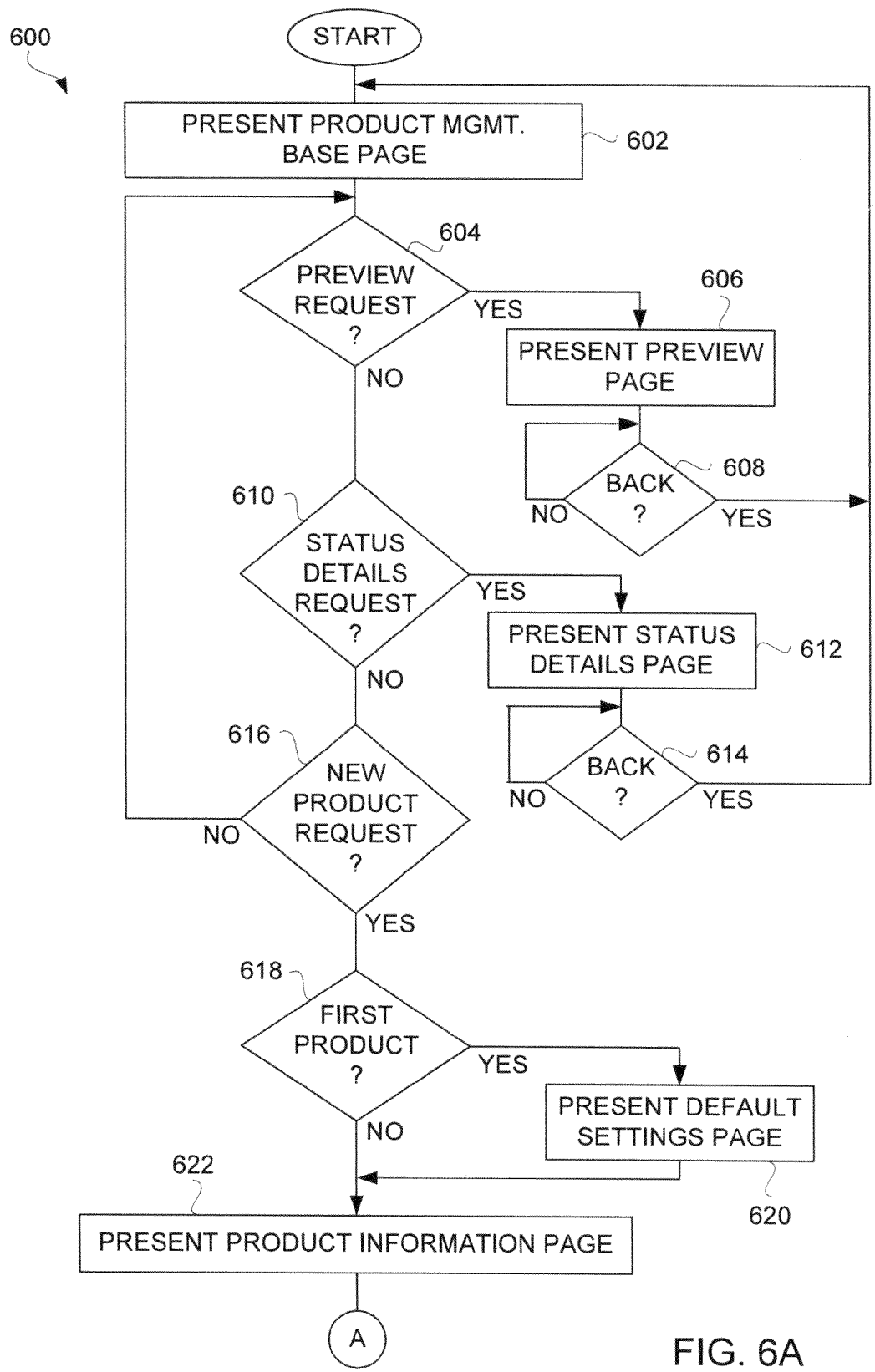
FIGS. 6A and 6B are flow diagrams of a product management process according to one embodiment of the invention.
Figure 6B:
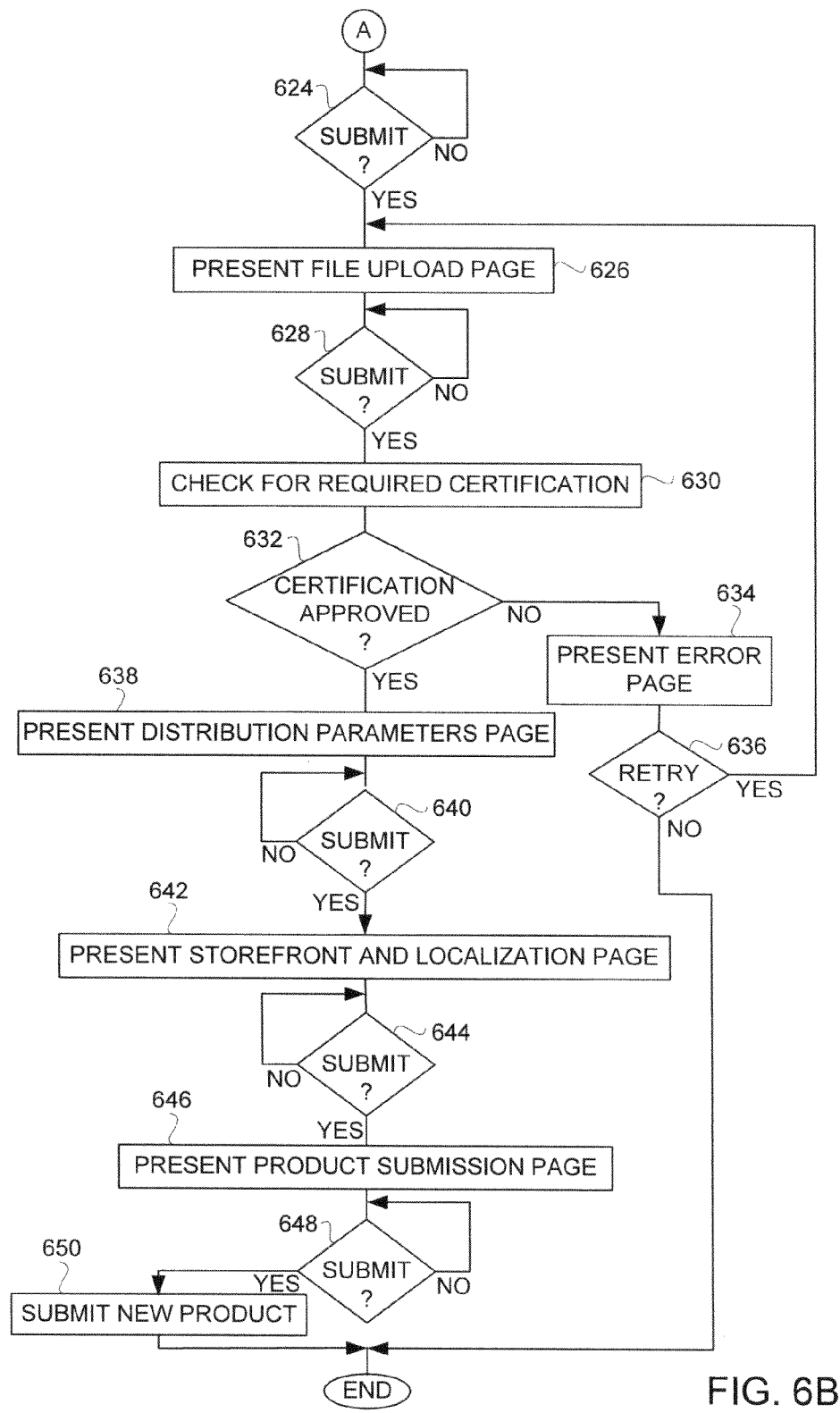

FIGS. 6A and 6B are flow diagrams of a product management process 600 according to one embodiment of the invention. The project management process 600 can be performed by a product management system, such as the product management system 500 illustrated in FIG. 5.

The product management process 600 can present 602 a product management base page. The product management base page, for example, can permit navigation to a new product page, a preview page and a status details page.

Next, a decision 604 can determine whether a preview request has been received. When the decision 604 determines that a preview request has been received, a preview page can be presented 606. A preview page can provide the user with a preview of how the digital product will be represented for distribution at the online distribution site. Following the presentation 606 of the preview page, a decision 608 can determine whether a back request has been received. When the decision 608 determines that a back request has not yet been received, the product management processing 600 can await such a request. However, once the decision 608 determines that a back request has been received, the product management process 600 can return to repeat block 602 so that the product management base page can again be presented 602.

Alternatively, when the decision 604 determines that a preview request has not been received, a decision 610 can determine whether a status details request has been received. When the decision 610 determines that a status details request has been received, a status details page can be presented 612. In one implementation, a status details page can provide the user with details on submission status of a submission of a digital product. Following the presentation 612 of the status details page, a decision 614 can determine whether a back request has been received. When the decision 614 determines that a back request has not yet been received, the product management processing 600 can await such a request. However, once the decision 614 determines that a back request has been received, the product management process 600 can return to repeat block 602 so that the product management base page can again be presented 602.

On the other hand, when the decision 610 determines that a status details request has not been received, a decision 616 can determine whether a new product request has been received. When the decision 616 determines that a new product request has not been received, the product management process 600 can return to repeat the decision 604 and subsequent blocks so that additional user requests can be processed. Alternatively, when the decision 616 determines that a new product request has been received, a decision 618 can determine whether the new product is a first product to be provided by the user to the product submission and management system. When the decision 618 determines that the new product is the first product, a default settings page can be presented 620. The user can interact with the default setting page to provide one or more default settings to be utilized by the product submission and management system.

Following block 620, as well as directly following the decision 618 when the new product is not the first product, a product information page can be presented 622. The user can interact with the product information page to enter product information to be utilized by the product submission and management system. Thereafter, a decision 624 can determine whether the user has submitted the product information page. When the decision 624 determines that the user has not yet submitted the product information page, the product management process 600 can await its submission.

Once the decision 624 determines that the user has submitted the product information page, a file upload page can be presented 626. The user can interact with the file upload page to specify one or more digital files that are to be uploaded and associated with the new product. A decision 628 can then determine whether the user has submitted the file upload page. When the decision 628 determines that the user has not yet submitted the file upload page, the product management process 600 can await its submission. Once the decision 628 determines that the user has submitted the file upload page, at least one of the digital files being uploaded can be checked 634 for a required certification (or authentication). Here, in one embodiment, at least one of the one or more digital files being uploaded is required to be certified (or authenticated) by a trusted authority so that the product submission and management system can ensure that the files are appropriate for submission. Following block 630, a decision 632 can determine whether the certification associated with the digital files has been approved. When the decision 632 indicates that certification is not approved, an error page can be presented 634. A decision 636 can determine whether the user is permitted to retry the uploading of digital files. When the decision 636 determines that a retry is permitted, the product management process 600 can return to repeat the decision 626 so that the user can again try to upload the one or more digital files.

On the other hand, when the decision 632 determines that the certification of the one or more digital files has been approved, a distribution parameters page can be presented 638. The distribution parameters page enables the user to enter one or more distribution parameters to be utilized during the distribution of the new product. For example, the user can specify pricing information to be utilized for the new product.

Following the presentation 638 of the distribution parameters page, a decision 640 determines whether the user has submitted the distribution parameters page. When the decision 640 determines that the user has not yet submitted the distribution parameters page, the product management process 600 can await its submission. Alternatively, when the decision 640 determines that the user has submitted the distribution parameters page, a storefront and localization page can be presented 642. The storefront and localization page enables the user to specify one or more particular storefronts from which the new product is to be made available for distribution. Additionally, the localization information can be provided when appropriate for such storefronts, such as when they are in different language countries. Following the presentation 642 of the storefront and localization page, a decision 642 can determine whether the user has submitted the storefront and localization page. When the decision 644 determines that the user has not yet submitted the storefront and localization page, the product management process 600 can await its submission. In another embodiment, localization can be provided in a localization page while storefront information can be provided in a storefront page. Thus, localization and storefront information can be provided can be provided with separate pages, a combined page, or a combination of other pages. For example, the storefront information can be provided with a distribution parameters page.

Alternatively, when the decision 644 determines that the user has submitted the storefront and localization page, a product submission page can be presented 646. The product submission page can facilitate the user in reviewing the previously provided information pertaining to the new product. In other words, the product submission page can allow the user to confirm the information about the new product that is about to be submitted to the product submission and management system. A decision 648 can then determine whether the user has submitted the product submission page. When the decision 648 determines that the user has not yet submitted the product submission page, the product management process 600 can await its submission. Alternatively, once the decision 648 determines that the user has submitted the product submission page, the product management process 600 submits 650 the information concerning the new product to the product submission and management system. After the submission 650, the product management process 600 can end.

Alternatively, following block 636 when a retry is not permitted, the product management process 600 can also end but in this case without having submitted a new product to the product submission and management system.

After a digital product has been submitted to a product submission and management system, a quality review process can be initiated. The quality review can have a number of states, including: in review, ready for sale, rejected or pending contract. The "in review" state is the initial state until the submission is rejected or approved. The "ready for sale" state is the status once the application file has been approved. The "rejected" state is the status if quality review finds the application filed deficient or defective. The "pending contract" state is the state when submitter lacks a contractual agreement for distribution.

Another aspect of the invention pertains to graphical user interfaces. The graphical user interfaces can present various pages (or screens), including those discussed above, to assist a user in interacting with a product submission and management system (or an online product distribution site). FIGS. 7A-12B are screen shots pertaining to representative graphical user interfaces.

FIGS. 7A-7D are representative screen shots pertaining to basic user interaction with an online product distribution site according to one embodiment of the invention.

Figure 7A:
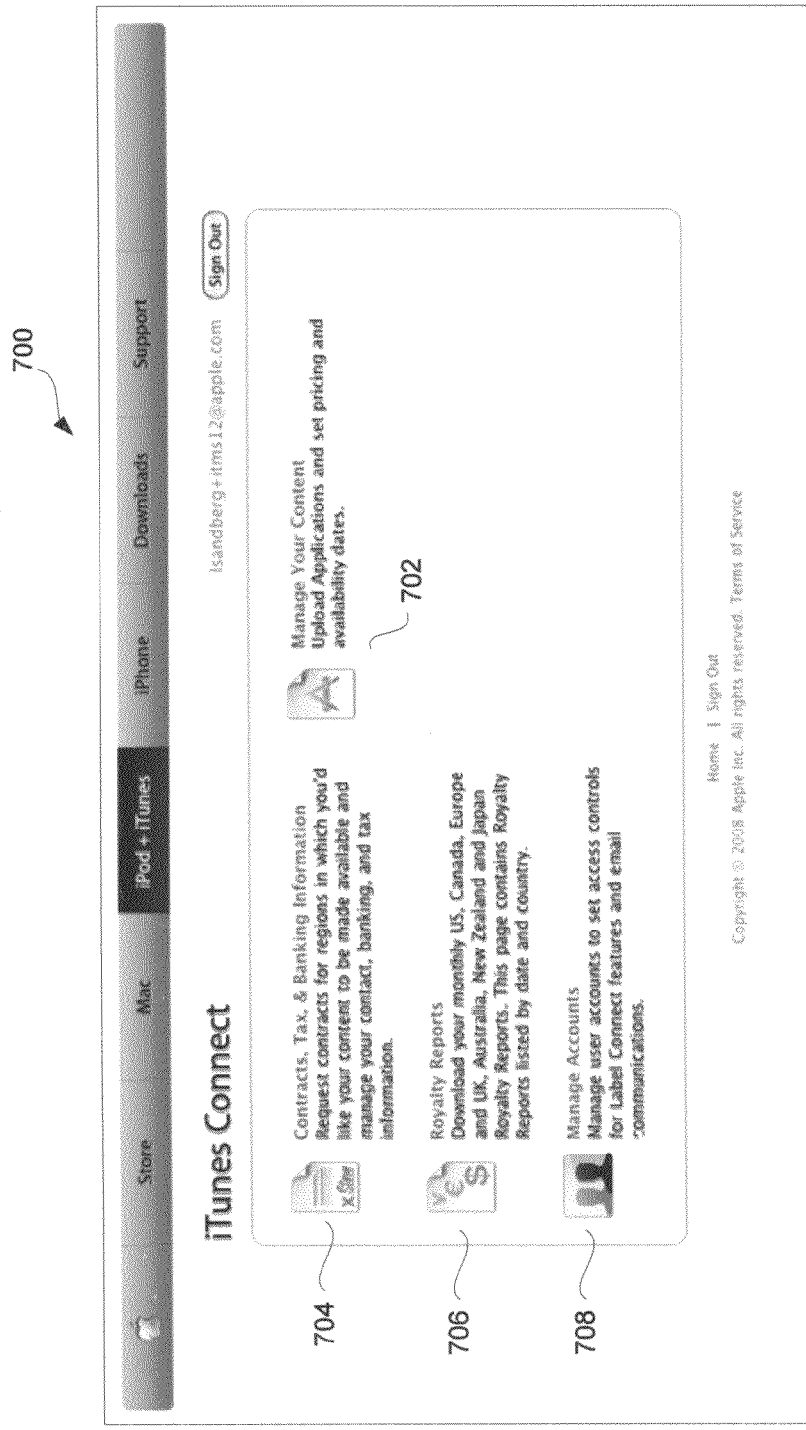
FIGS. 7A-7D are representative screen shots pertaining to basic user interaction with an online product distribution site according to one embodiment of the invention.

FIG. 7A is a representative screen shot of a system navigation page 700 according to one embodiment of the invention. The system navigation page 700 can provide user access to a plurality of functional modules, for example, a product management module 702 ("Manage Your Content"), a contract request module 704 ("Contracts, Tax & Banking Information"), a royalty module 706 ("Royalty Reports"), or an account management module 708 ("Manage Accounts"). These functional modules are similar to the modules 306-312 illustrated in FIG. 3. The system navigation page 700 can, for example, represent the system navigation page 304 illustrated in FIG. 3.

Figure 7B:
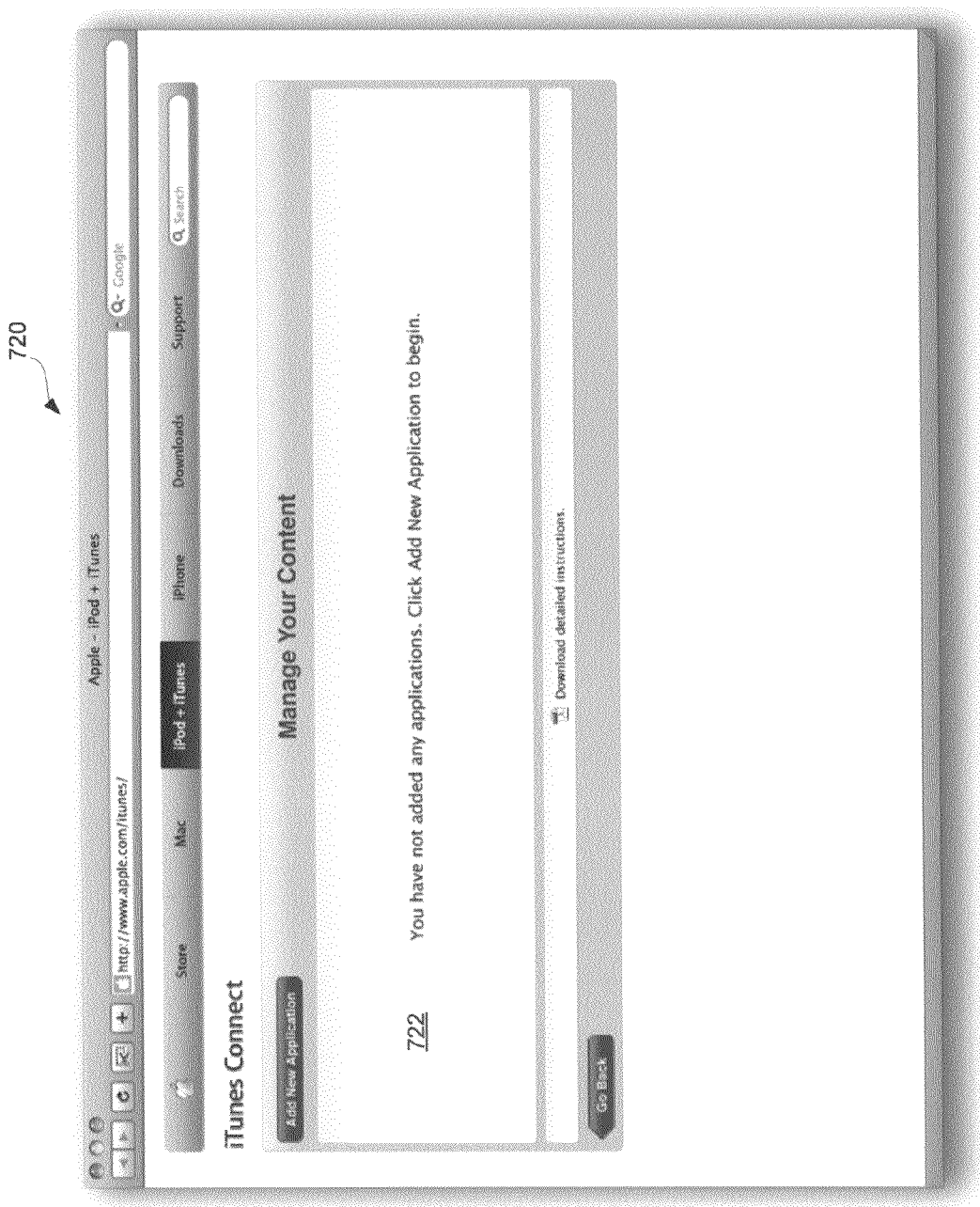

FIG. 7B is a representative screen shot of a product management base page 720 according to one embodiment of the invention. The product management base page 720 can, for example, represent the product management base page 502 Illustrated in FIG. 5 or the product management base page presented 602 in FIG. 6A. The product management based page 720 can be utilized by a user to manage submission of digital products to a product submission and management system for eventual distribution by an online product distribution site. The product management base page 720 includes a new application window 722. The new application window 722 can list or otherwise identify any applications that have been submitted to the product submission and management system for eventual distribution by the online product distribution site. As illustrated in FIG. 7B, the new application window is empty because the user has not yet added any applications for submission to the online product distribution site.

Figure 7C:
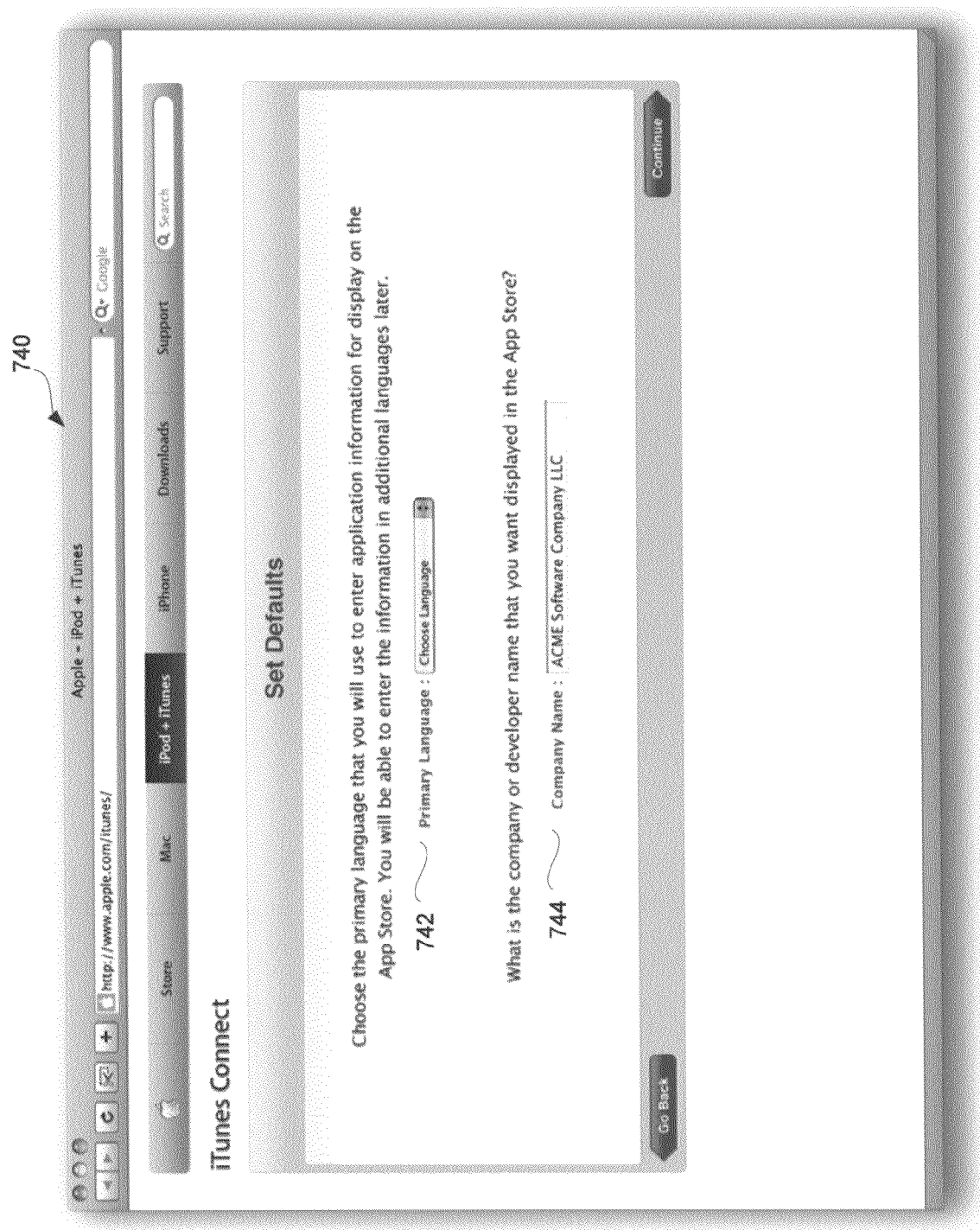

FIG. 7C is a representative screen shot of a default settings page 740 according to one embodiment of the invention. The default settings page 740 can, for example, represent the default settings page 504 Illustrated in FIG. 5 or the default settings page presented 620 in FIG. 6A. The default settings page 740 is utilized by a user to set initial settings to be utilized with the product submission and management system for eventual distribution by the online product distribution site. In the example illustrated in FIG. 7C, the initial settings pertain to a primary language and any company name. More particularly, the default settings page 740 can display a primary language selector 742 for user selection of a primary language for digital products to be distributed via the online product distribution site. The default settings page 740 can also display a company name area 744 where the user can provide the name of the company that is offering the digital products for sale via the online product distribution site.

Figure 7D:
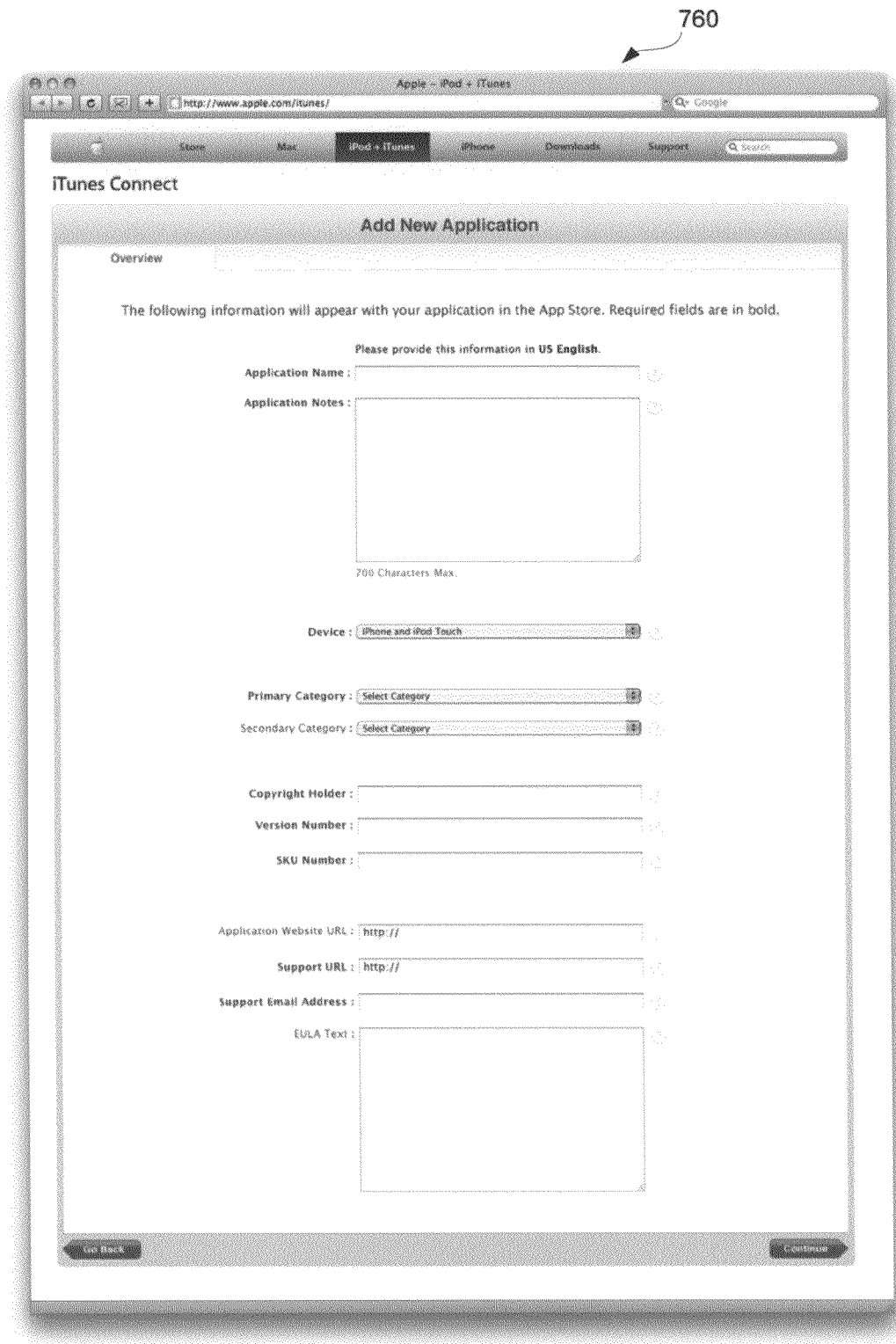

FIG. 7D is a representative screen shot of a product information page 760 according to one embodiment of the invention. The product information page 760 can, for example, represent the product information page 506 Illustrated in FIG. 5 or the product information page presented 622 in FIG. 6A. The product information page 760 can be utilized by a user to provide product information for a new product (e.g., new application) being submitted by the user to the product submission and management system for eventual distribution by the online product distribution site. Product information for a product (digital product) can also be referred to as metadata. As illustrated in FIG. 7D, the product information page 760 can present a webpage form to the user such that the user can provide particular product information for the new digital product being submitted. Specifically, the webpage form illustrated in FIG. 7D requests product information, including: application name, application notes, device (suitable devices), primary category (genre) for the digital product, secondary category (genre) for the digital product, copyright holder, version number, SKU number, application website URL, support URL, support e-mail address, and license agreement text (EULA text). The suitable devices can thus be identified by the user. For example, when the new digital product is a new application executable only on certain hardware or software applications, the user can so designate the suitable devices or device types. Additionally, the entry of the product information can be validated for appropriate data entry into the webpage form before being accepted.

FIGS. 8A-8E are representative screen shots pertaining to uploading of one or more files according to one embodiment of the invention. The one or more files being uploaded to pertaining to a digital product being submitted to the product submission and management system for eventual distribution by the online product distribution site.

Figure 8A:
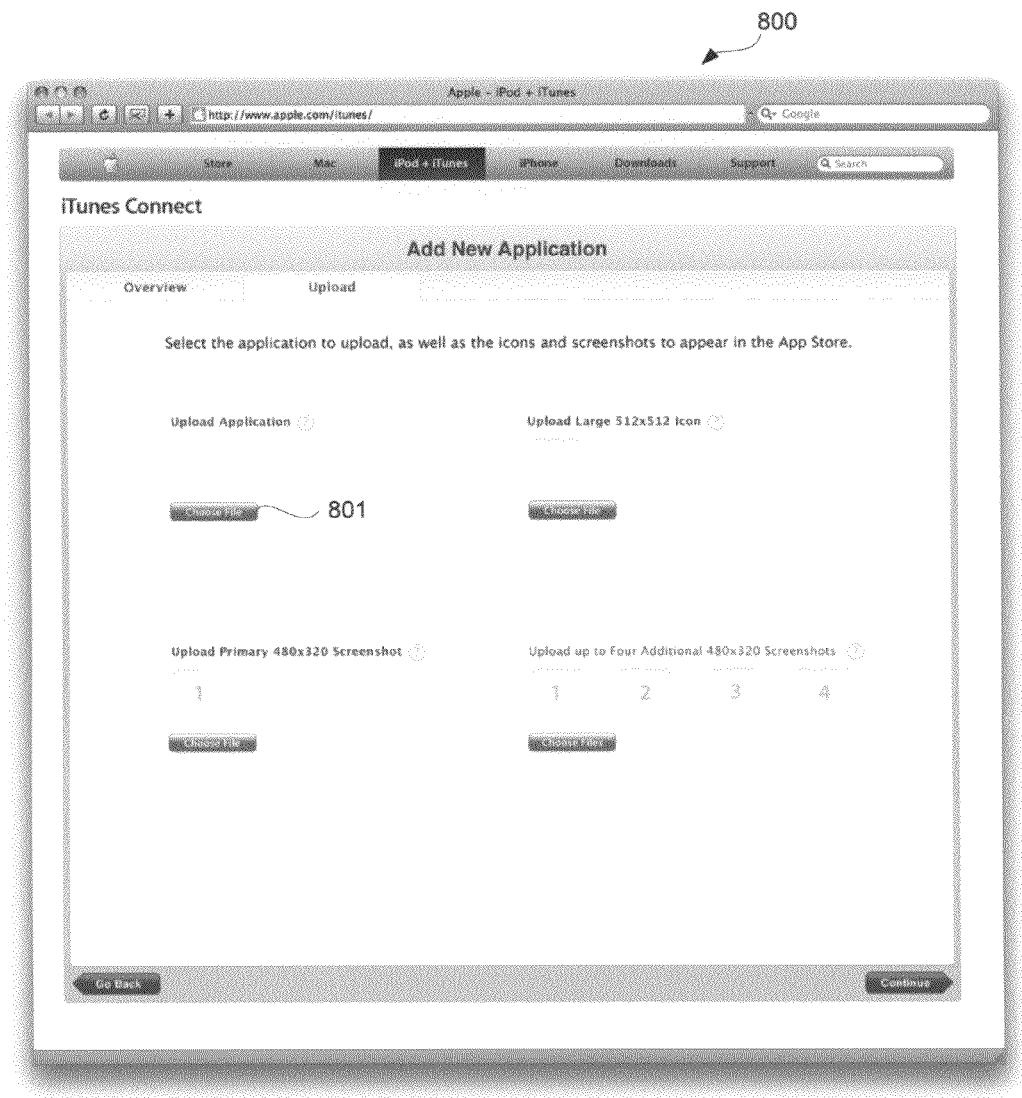
FIGS. 8A-8E are representative screen shots pertaining to uploading of one or more files according to one embodiment of the invention.

FIG. 8A illustrates a file upload page 800 according to one embodiment of the invention. The file upload page 800 allows a user to select one or more digital files to be associated with a digital product being submitted. The one or more digital files can include an application file as well as files pertaining to one or more icons and/or screen shots. The icons and/or screen shots can be utilized by the online product distribution site when the digital product being submitted is offered for distribution (purchase or rental). For example, when the digital product pertains to a computer software application, the file upload page 800 permits a user to select the application file (e.g., executable program file) to upload as well as to specify one or more icons and/or screen shots associated with the computer software application.

Figure 8B:
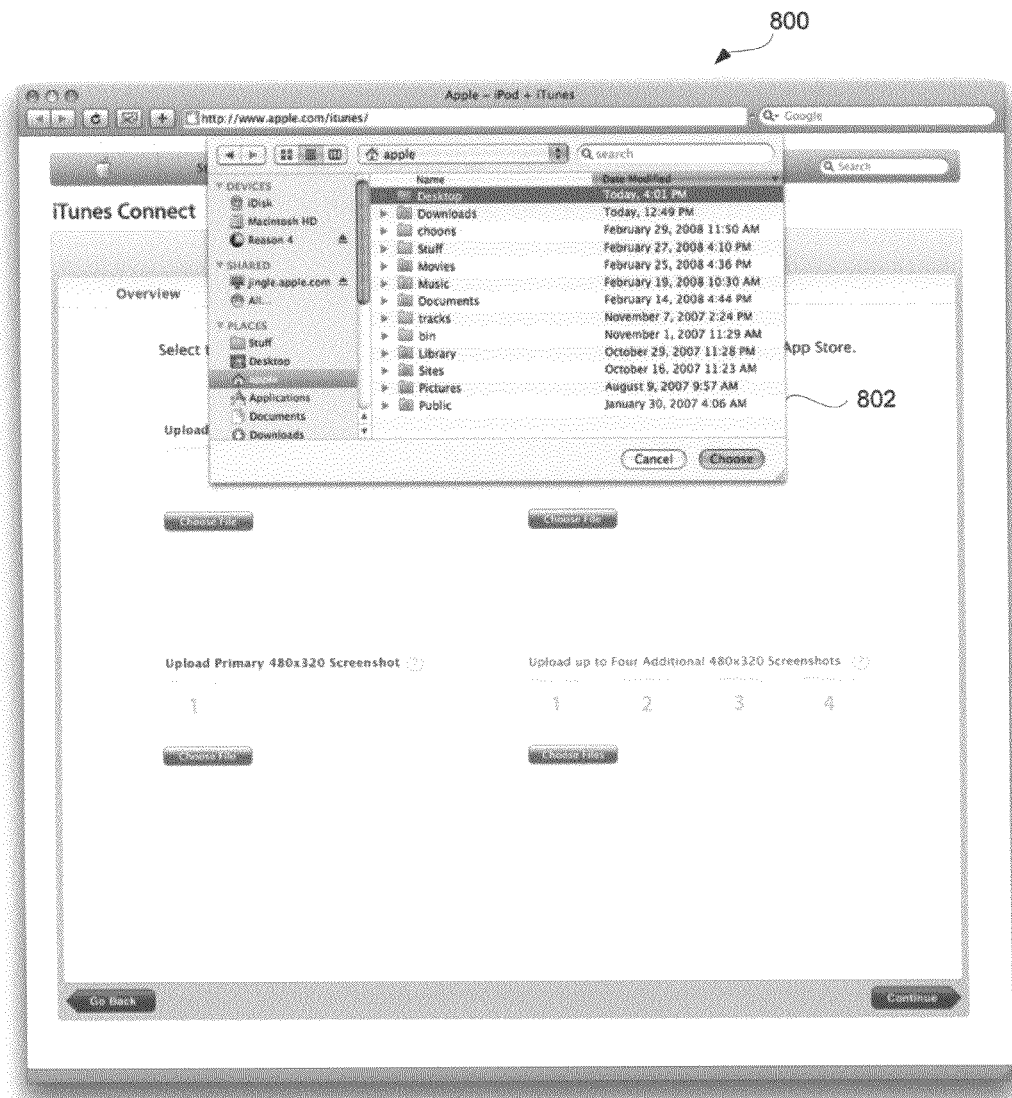
Figure 8C:
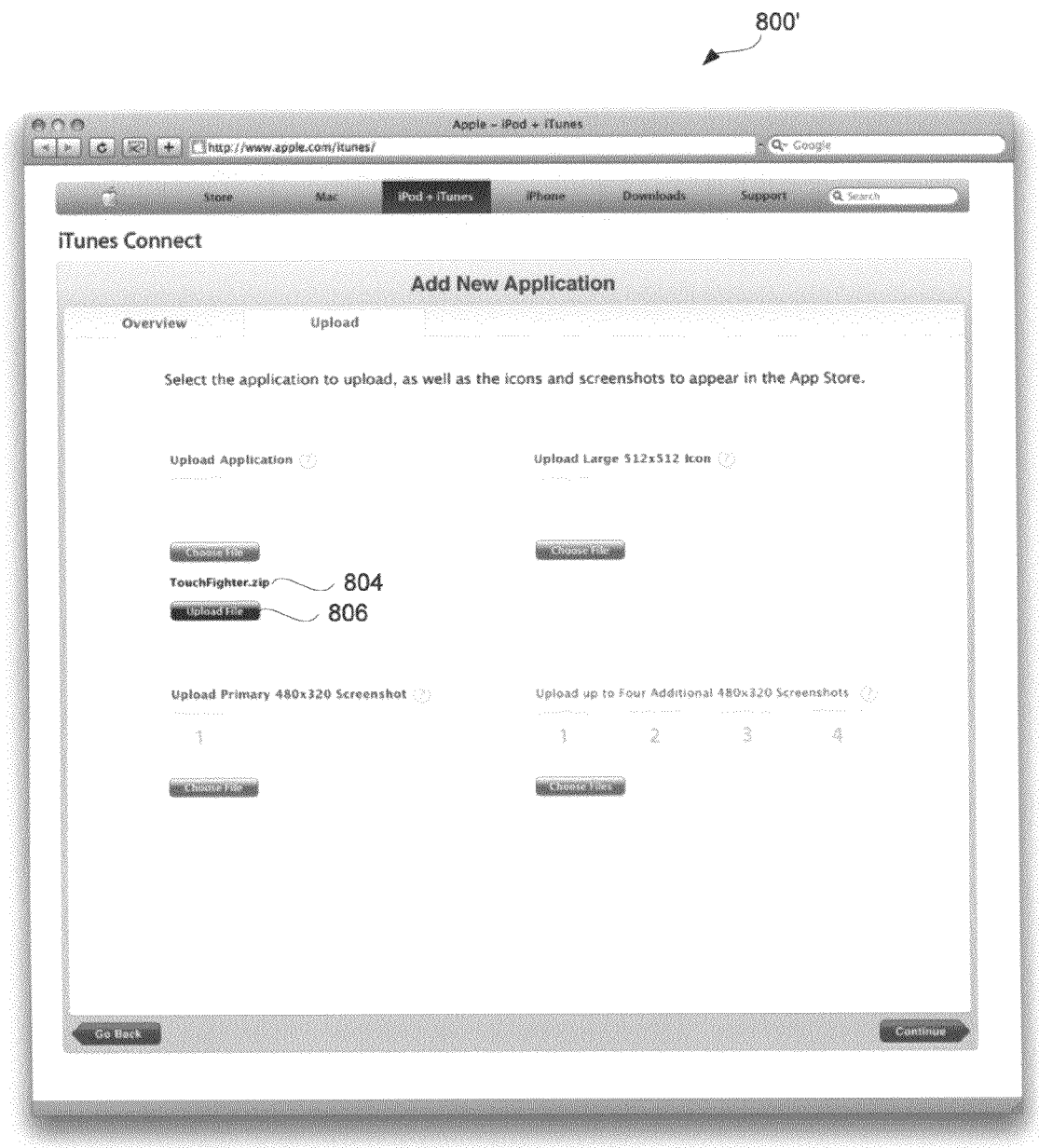
Figure 8D:
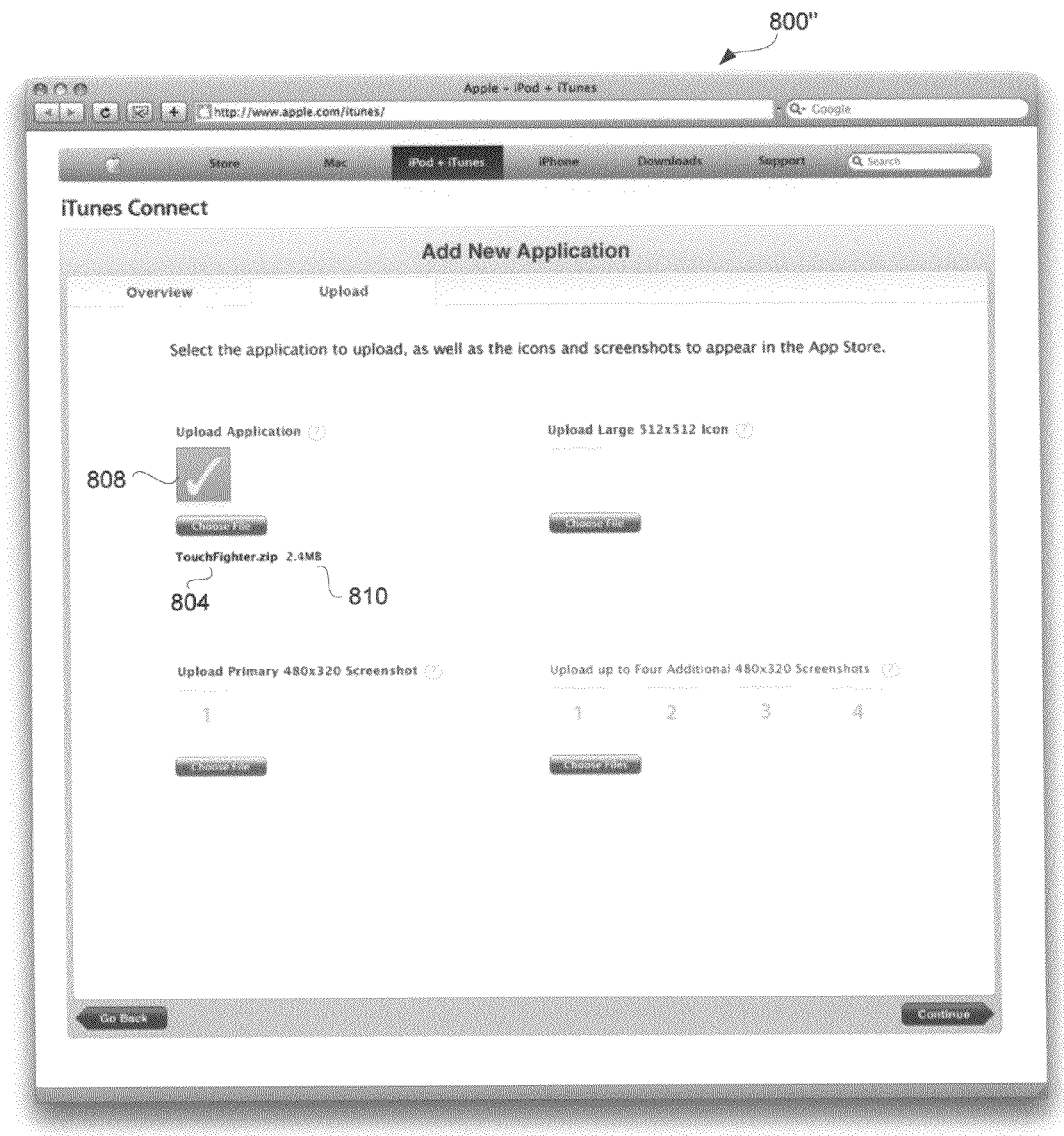

As illustrated in FIG. 8B, to identify an application file to be uploaded, the user can select a choose file control 801. In response to selecting the choose file control 801, a file identification dialog box 802 can be presented over the file upload page 800 as shown in FIG. 8B. The user can utilize the file identification dialog box 802 to specify the application file to be uploaded. Once the user utilizes the file identification dialog box 802 to choose a particular application file to be uploaded, the file upload page 800 can be updated. FIG. 8C illustrates an updated file upload page 800'. As shown in FIG. 8C, the file upload page 800' is now updated to specify an identifier 804 for the chosen file. In addition, the file upload page 800' can present an upload file control 806. Upon selection of the upload file control 806, the upload operation of the chosen file specified by the identifier 804 can be initiated. In one implementation, the application file can be required to a compressed file format (e.g., ".zip") including a binary file for the application and an icon for display on a device that executes the program. Also, in one implementation, the upload of the application file can require a successful code sign check (i.e., digital signature verification for authentication). Once the file has successfully uploaded, the file upload page 800' can again be updated as illustrated in FIG. 8D. In FIG. 8D, the file upload page 800" can include an upload completion indicator 808. The upload completion indicator 808 indicates that chosen file associated with the identifier 804 has been uploaded. A file size indicator 810 can also be presented on the file upload page 800" to indicate the size of the chosen file which has been uploaded. Still further, the user can further interact with the file upload page 800" such that one or more icons and/or screen shots associated with the digital product (e.g., computer software application) can similarly be uploaded.

Figure 8E:
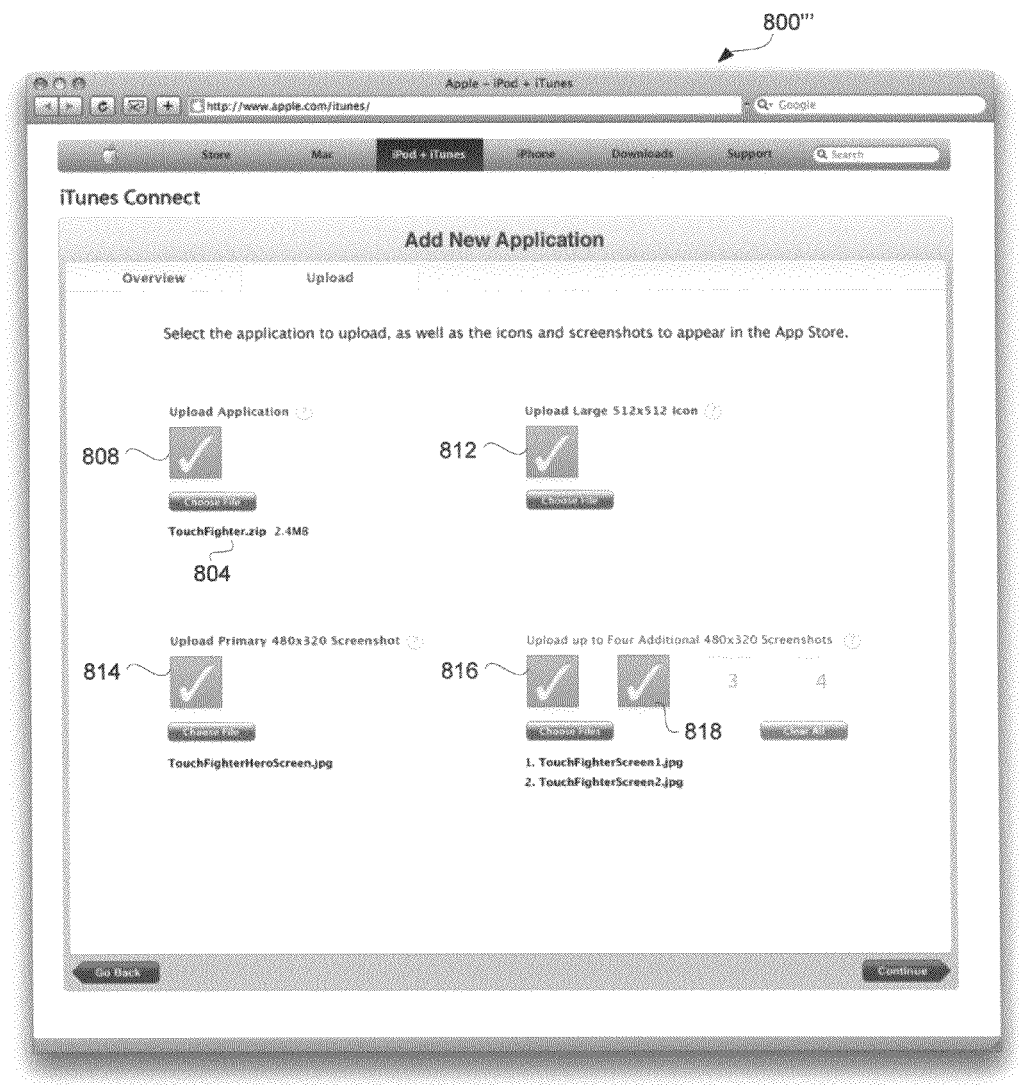

FIG. 8E illustrates the file upload page 800''' after chosen files for each of the application, an icon, a primary screen shot, and a pair of additional screen shots have been uploaded. These uploaded files for the digital product are eventually used by the online product distribution site when distributing the digital product. As illustrated in FIG. 8E, all of these mentioned files have been uploaded and the upload file page 800''' displays indicators 808, 812, 814, 816 and 818 to inform the user that these files have been successfully uploaded. The indicator 812 indicates that a specified icon file has been uploaded. The indicator 814 indicates that a specified primary screen shot has been uploaded. The indicators 816 and 818 specify that a two additional screen shots have been uploaded.

FIGS. 9A-9D are representative screen shots pertaining to setting pricing parameters according to one embodiment of the invention. The pricing parameters are associated with and used for a digital product being submitted to the product submission and management system for eventual distribution by the online product distribution site.

Figure 9A:
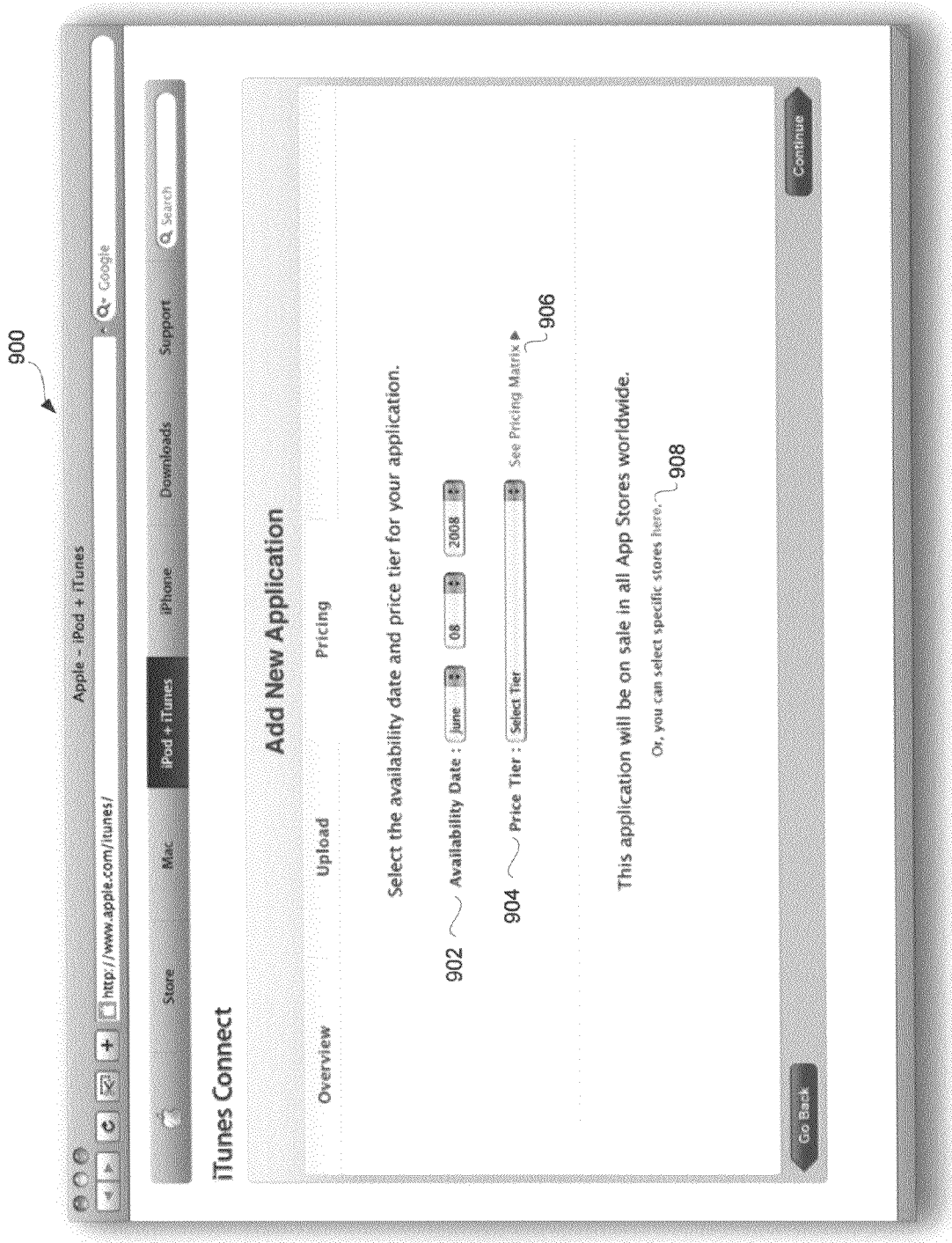
FIGS. 9A-9D are representative screen shots pertaining to setting pricing parameters according to one embodiment of the invention.

FIG. 9A is a representative screen shot of a pricing parameters page 900 according to one embodiment of the invention. The pricing parameters page 900 represents one implementation of a distribution parameters page, such as the distribution parameters page 510 illustrated in FIG. 5 or the distribution parameters page presented 638 as illustrated in FIG. 6B. The pricing parameters page 900 includes an availability date selector 902 and a pricing tier selector 904. The user can interact with the availability date selector 902 to select an availability date to be associated with the digital product being submitted to the product submission and management system. The availability date is the date that the online product distribution site is authorized to distribute the digital product. In addition, the user can interact with the price tier selector 904 to select a pricing tier to be associated with the digital product. The pricing tier is the pricing structure that is utilized by the online product distribution site when distributing the particular digital product. The pricing parameters page 900 also includes an availability control 908.

Figure 9B:
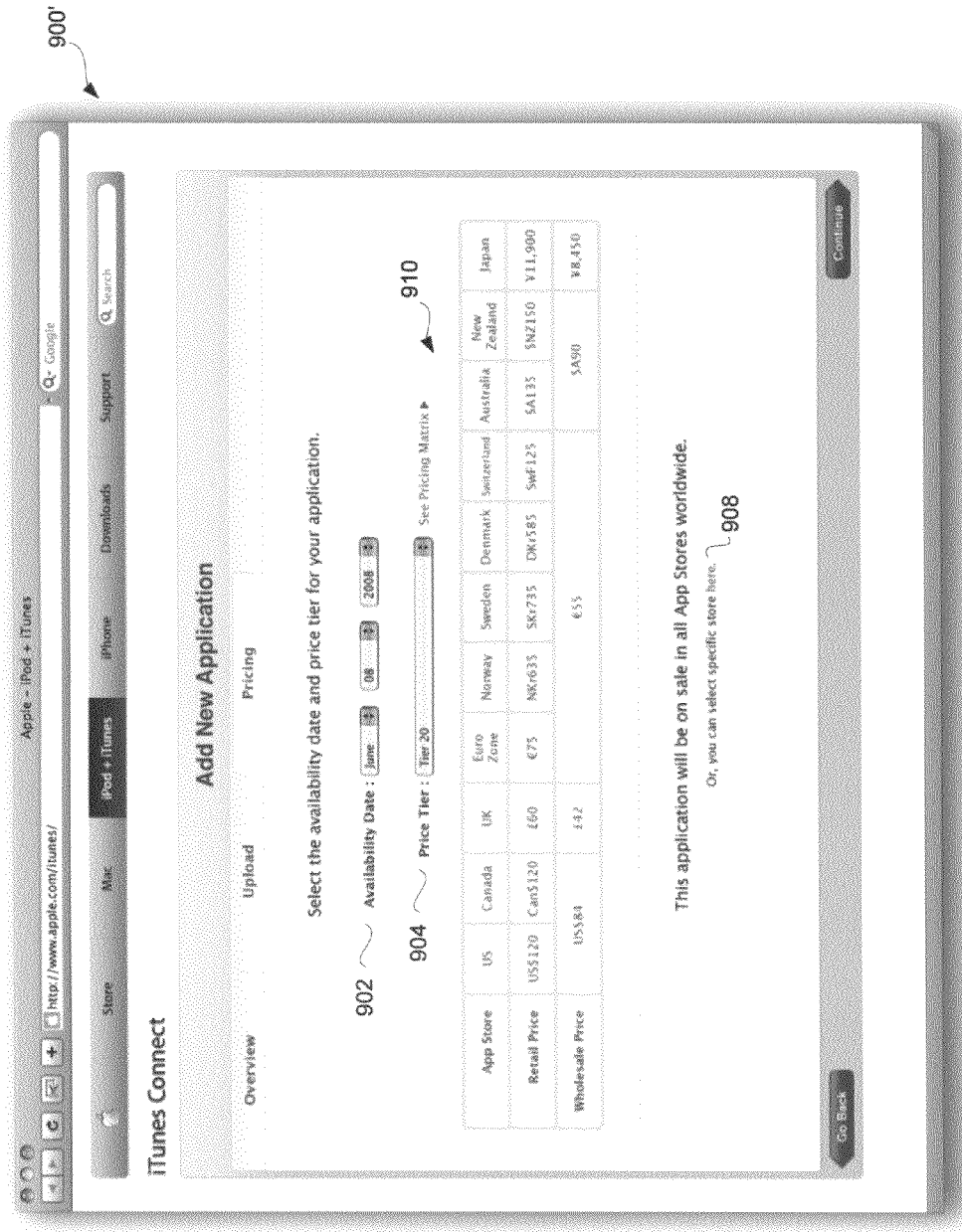

When the user considering the appropriate pricing tier to select using the price tier selector 904, the user can review additional details on pricing structures by selecting a pricing matrix control 906. Selection of the pricing matrix control 906 causes a pricing matrix to be displayed. FIG. 9B illustrates the pricing parameters page 900' following the user selection of the pricing matrix control 906. The pricing parameters page 900' is the same as the pricing parameters page 900 except that a pricing matrix 910 is now displayed. The pricing matrix 910, in the embodiment illustrated in FIG.

9B, provides a pricing structure based on the relationship between the online store selling the digital product (e.g. different countries) along with retail and wholesale prices.

Figure 9C:
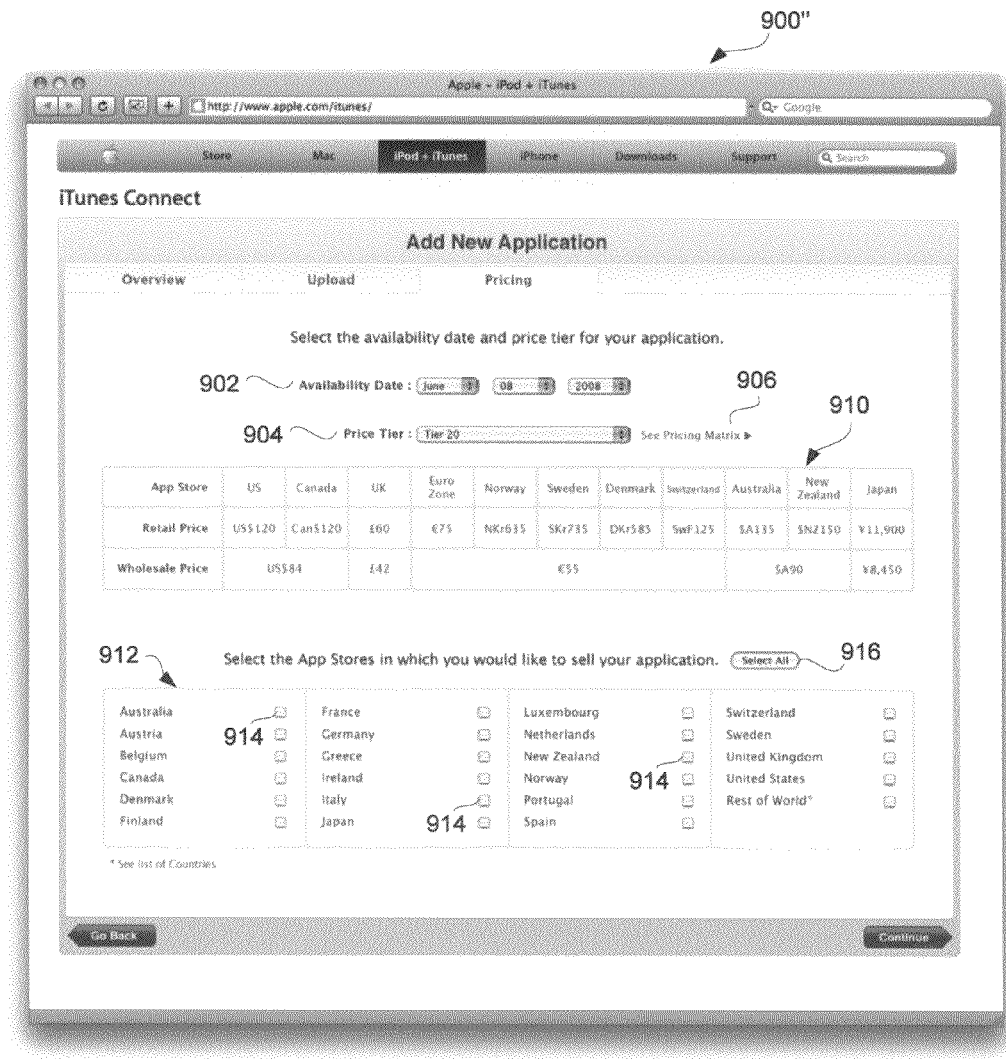
Figure 9D:
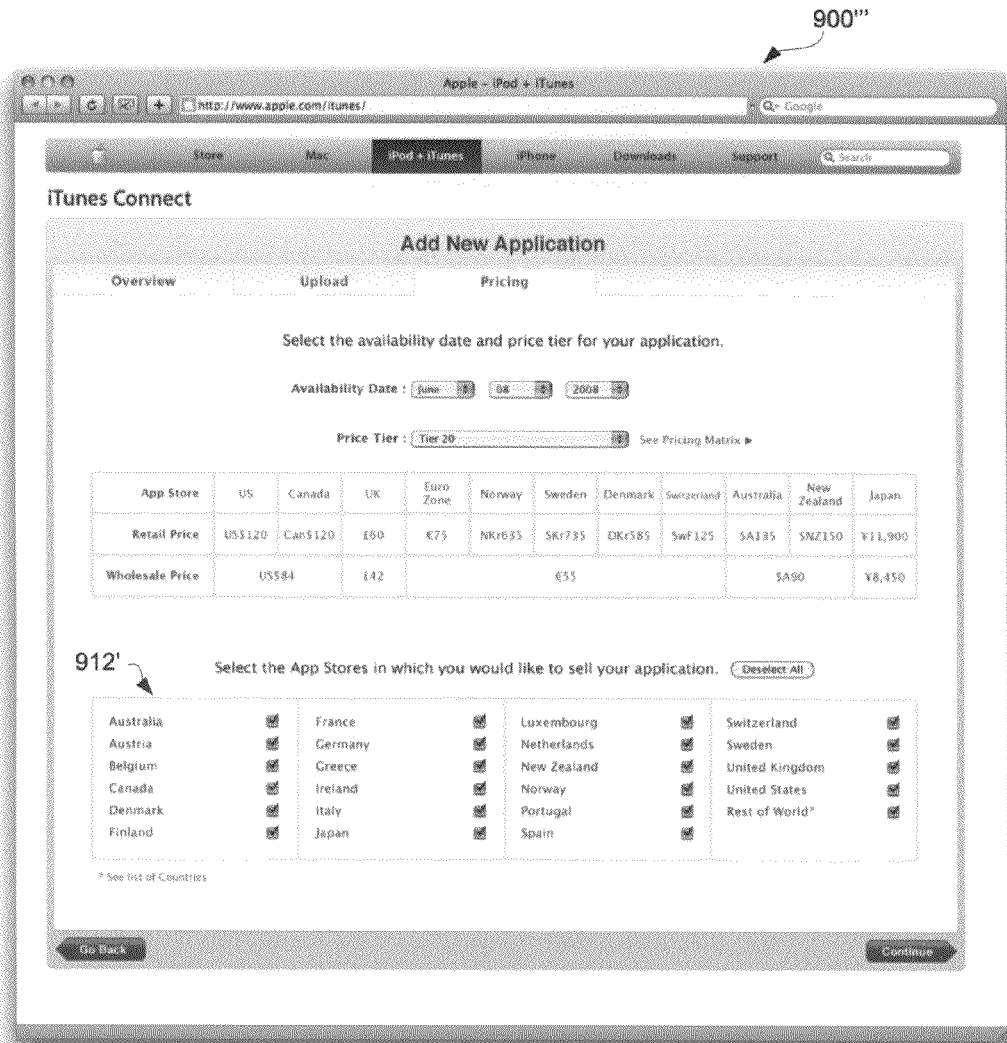

When the user selects the availability control 908, the pricing parameters page 900' can be updated to a pricing parameters page 900" as illustrated in FIG. 9C. In particular, the pricing parameters page 900" further includes a store-specific availability control table 912. Using the store-specific availability control table 912, the user can designate individual stores using selectors 914 or can use a "select all" control 916 to select all of the stores. In the event that all of the stores are individually selected or selected using the "select all" control 916, the pricing parameters page 900" can be updated to a pricing parameters page 900'" as illustrated in FIG. 9D. In FIG. 9D, the store-specific availability control table 912' is updated to show the store-specific availability control table 912 with each of the individual store selectors 914 being checked.

FIGS. 10A-10D are representative screen shots pertaining to setting localization parameters according to one embodiment of the invention. The localization parameters are associated with and used for a digital product being submitted to the product submission and management system for eventual distribution by the online product distribution site. For example, when the online product distribution site offers products for sale through use of different online stores associated with different countries or regions, it can be advantageous to provide localized product information.

Figure 10A:
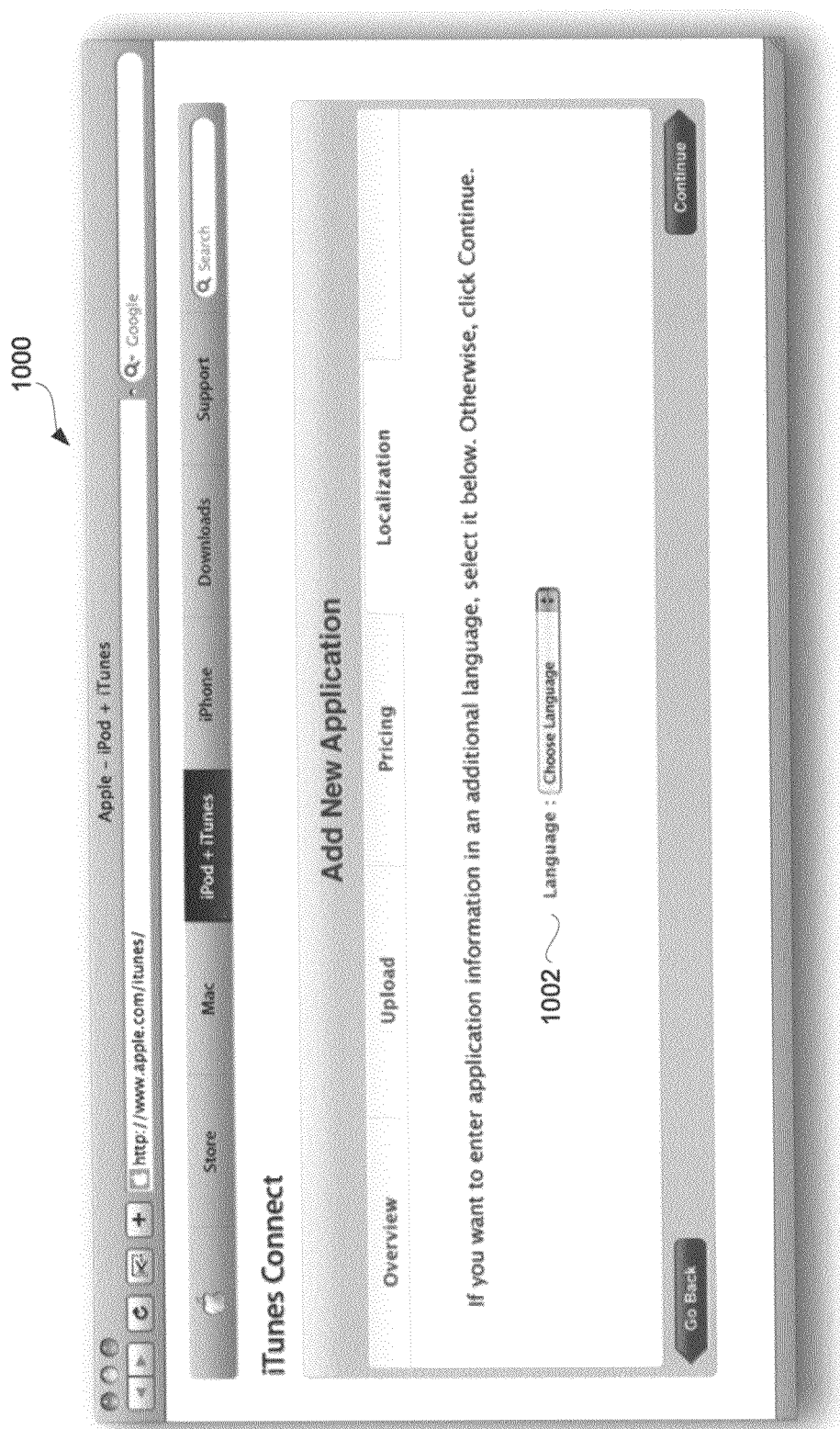
FIGS. 10A-10D are representative screen shots pertaining to setting localization parameters according to one embodiment of the invention.

FIG. 10A is a screen shot of a localization page 1000 according to one embodiment of the invention. The localization page 1000 can, for example, represent one embodiment of the storefront and localization page 512 illustrated in FIG. 5 or the storefront and localization page being presented 642 as illustrated in FIG. 6B. The localization page 1000 includes a language selector 1002. Using the language selector 1002, the user can provide one or more additional languages for the digital product being submitted so that some localized product information can be configured. For example, if the user utilizes the language selector 1002 to select "French" as an additional language to be supported, a product information localization page can be presented.

Figure 10B:
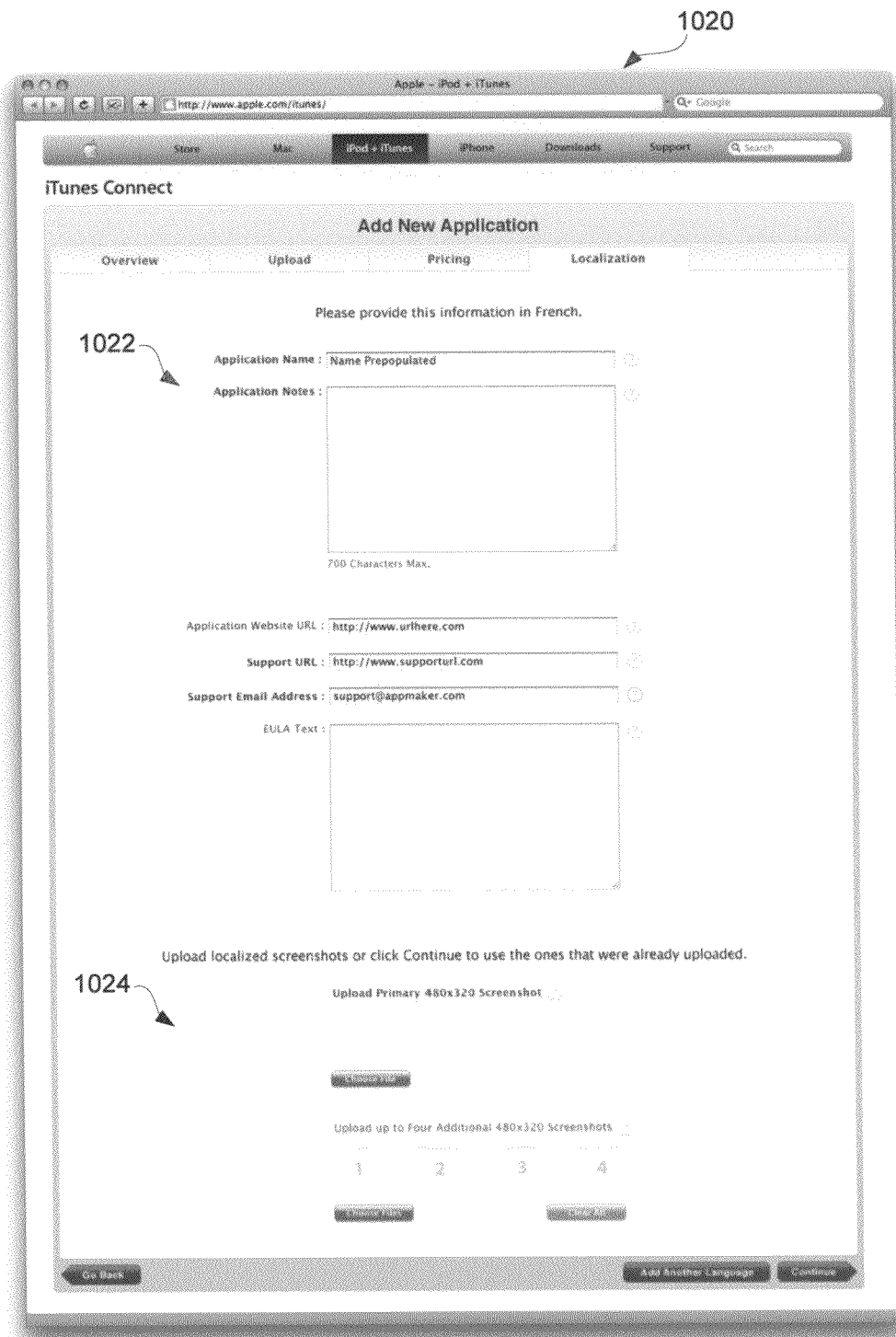

FIG. 10B illustrates a representative product information localization page 1020 according to one embodiment of the invention. The product information localization page 1020 includes a product information region 1022 that permits the user to enter localized product information for those online stores utilizing "French" as the appropriate language. As illustrated in FIG. 10B, certain of the product information fields that are editable by the user can be pre-populated with information party entered using the product information page for the primary language (see FIG. 7D). As a result, the user can utilize a different application name, different application notes, different URLs, different e-mail addresses, and different license agreements in different countries or geographic areas. The product information localization page 1020 can also include a screen shot localization region 1024. Using the screen shot localization region 1024, the user can provide different screen shots to be utilized when offering the digital product for sale at the different online stores in the different countries or geographic regions.

Figure 10C:
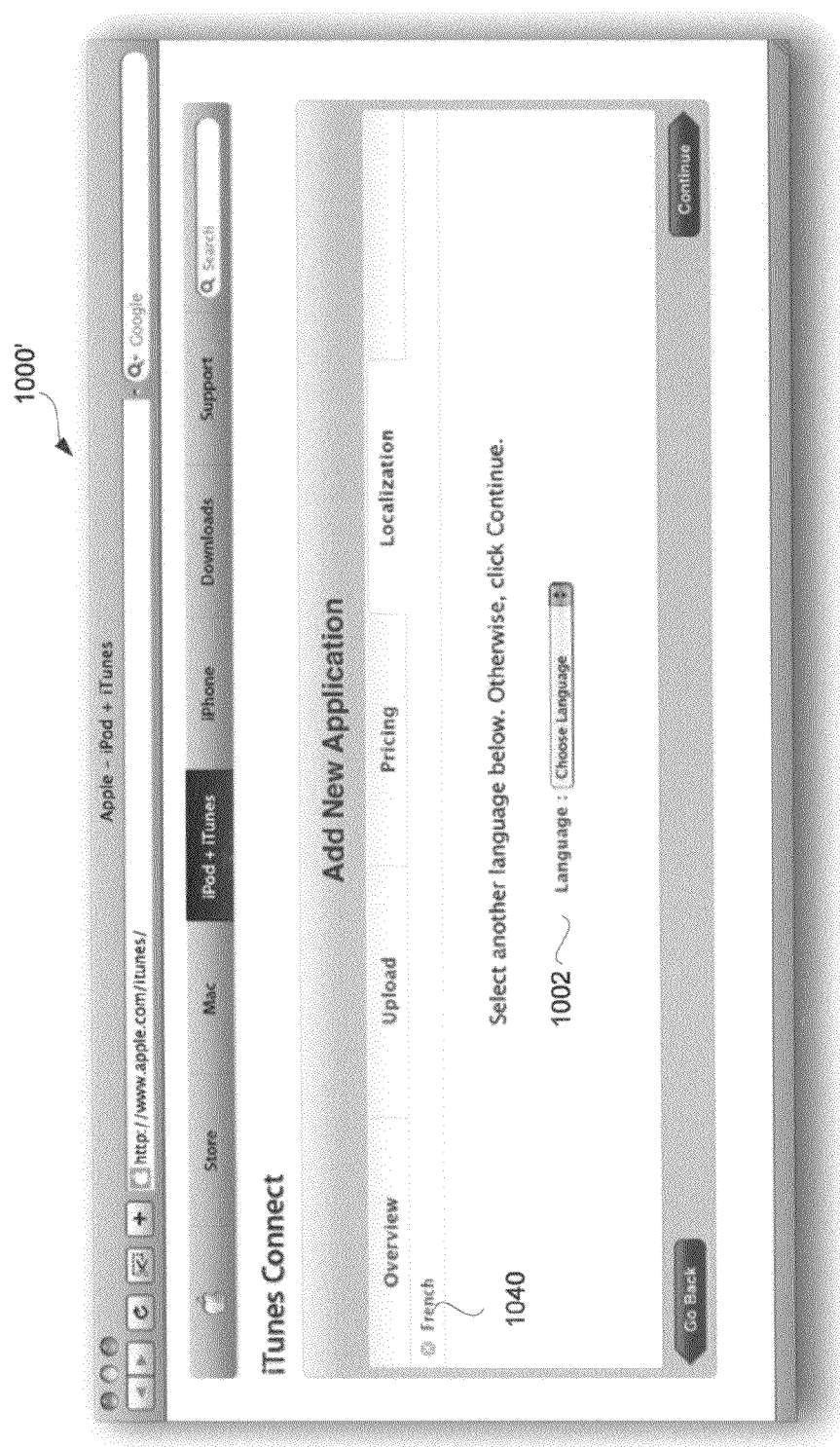
Figure 10D:
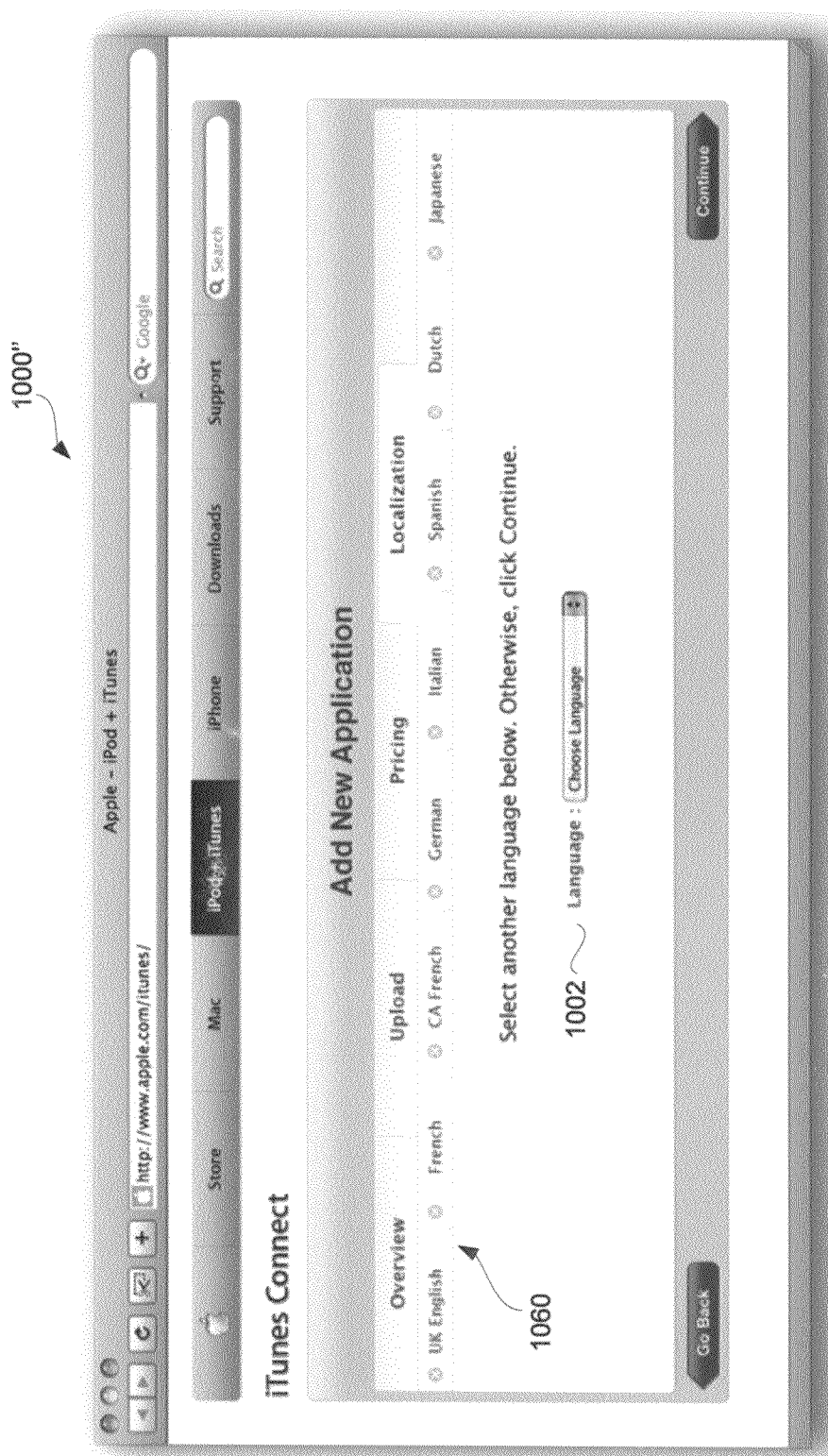

After new user is done interacting with and the product information localization page 1020, FIG. 10C can present a localization page 1000'. The localization page 1000' illustrated in FIG. 10C represents an updated version of the localization page 1000 illustrated in FIG. 10A. As shown in FIG. 10C, a French indication 1040 signals that the digital product has certain localization information for an online store utilizing French as its language. At this point, the user can continue to select additional languages using the language selector 1002 and again provide localization information. In the event that the user does continue to enter localization information for other different languages, as an example, the localization page 1000' can further update as shown in FIG. 10D. FIG. 10D illustrates a screen shot of a representative localization page 1000". The localization page 1000" includes a localization reference area 1060 that provides indications of the one or more different countries or geographic regions for which localization information has been provided for the digital product.

Figure 11:
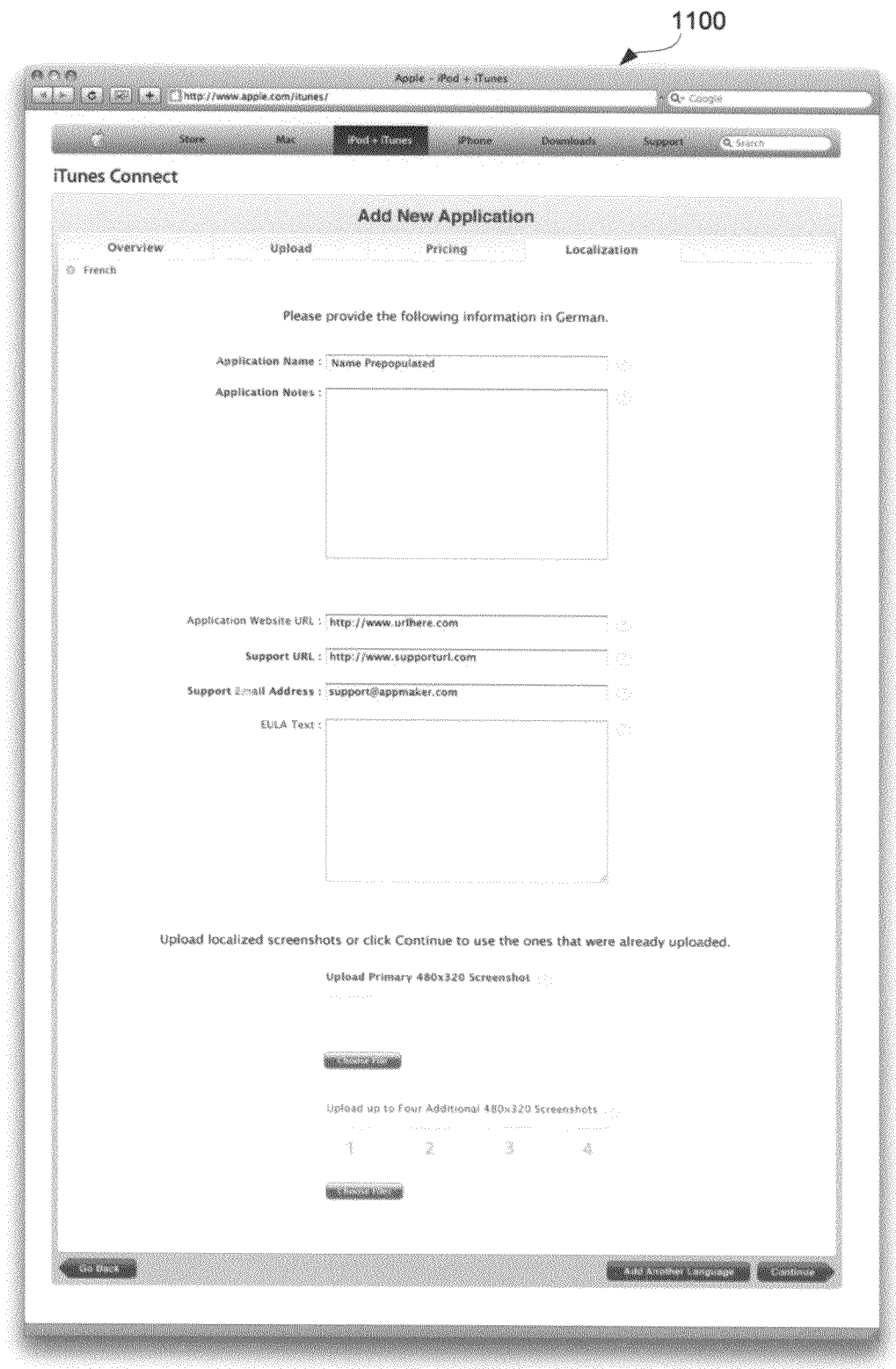
FIG. 11 is a screen shot of a representative product submission page according to one embodiment of the invention.

FIG. 11 is a screen shot of a representative product submission page 1100 according to one embodiment of the invention. The product submission page 1100 can present to the user a summary of the product, uploaded files, pricing, localization and other information that the user has provided or designated for a particular digital product. The product submission page 1100 allows the user to confirm such information and, once confirmed, cause the formal submission of the digital product and all its provided information to the online product distribution site.

Figure 12A:
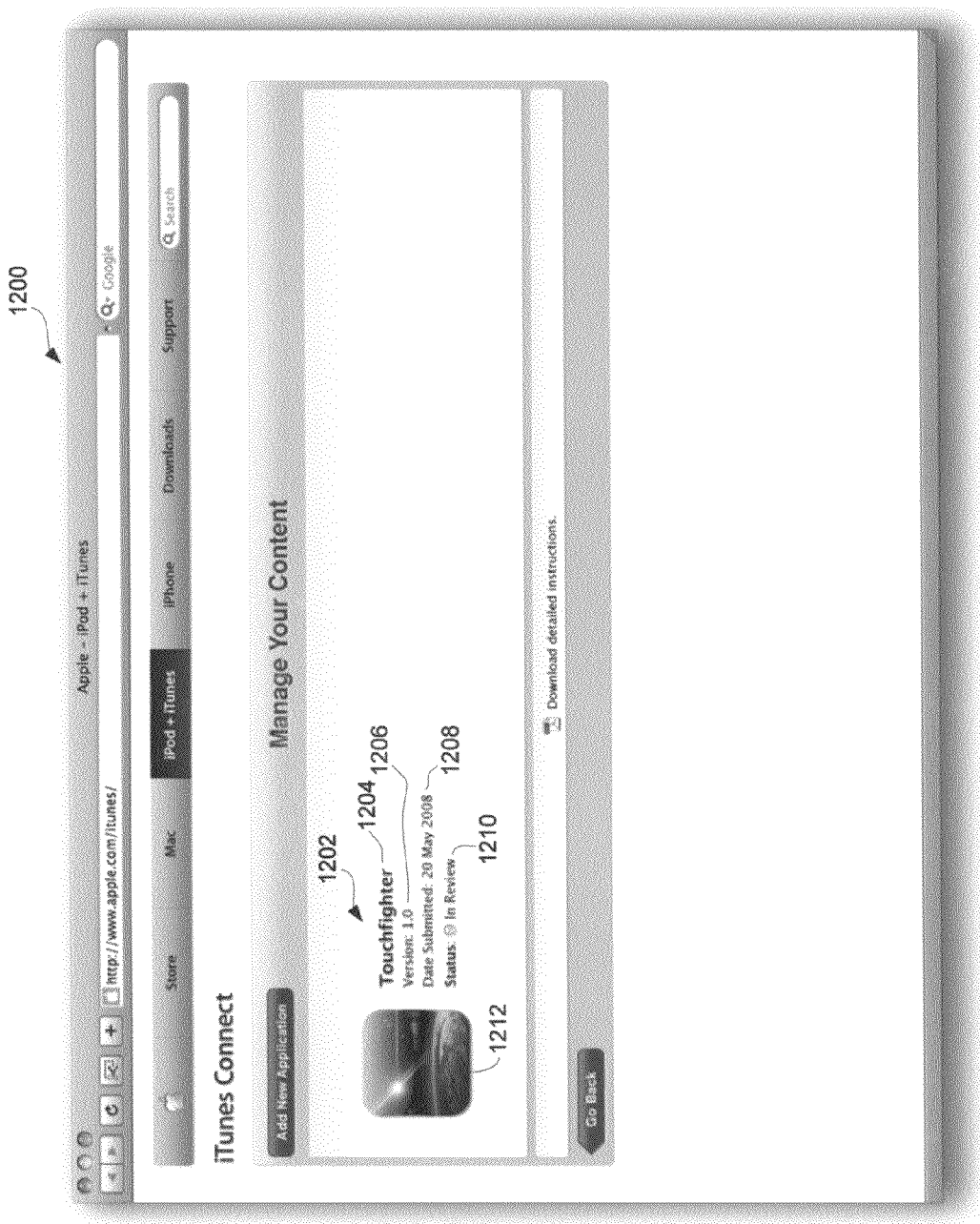
FIGS. 12A and 12B are screen shots of a representative product management base page according to one embodiment of the invention.

FIG. 12A is a screen shot of a representative product management base page 1200 according to one embodiment of the invention. The product management base page 1200 provides a product designation region 1202. The product designation region 1202 can include a product name 1204, a version indication 1206, a submission date 1208, a status indication 1210, and an image representation 1212. The product name 1204, the version indication 1206 and the image representation 1212 are items that were previously provided during the submission process. The date submitted 1208 is the date that the user made the formal submission of the digital product to the product submission and management system for eventual distribution by the online product distribution site. The status indication 1210 can indicate, as illustrated in FIG. 12A, that the digital product that has been submitted is currently under review. Since the digital product is under review (and thus not yet approved), the digital product is not yet offered for sale by the online product distribution site.

Figure 12B:
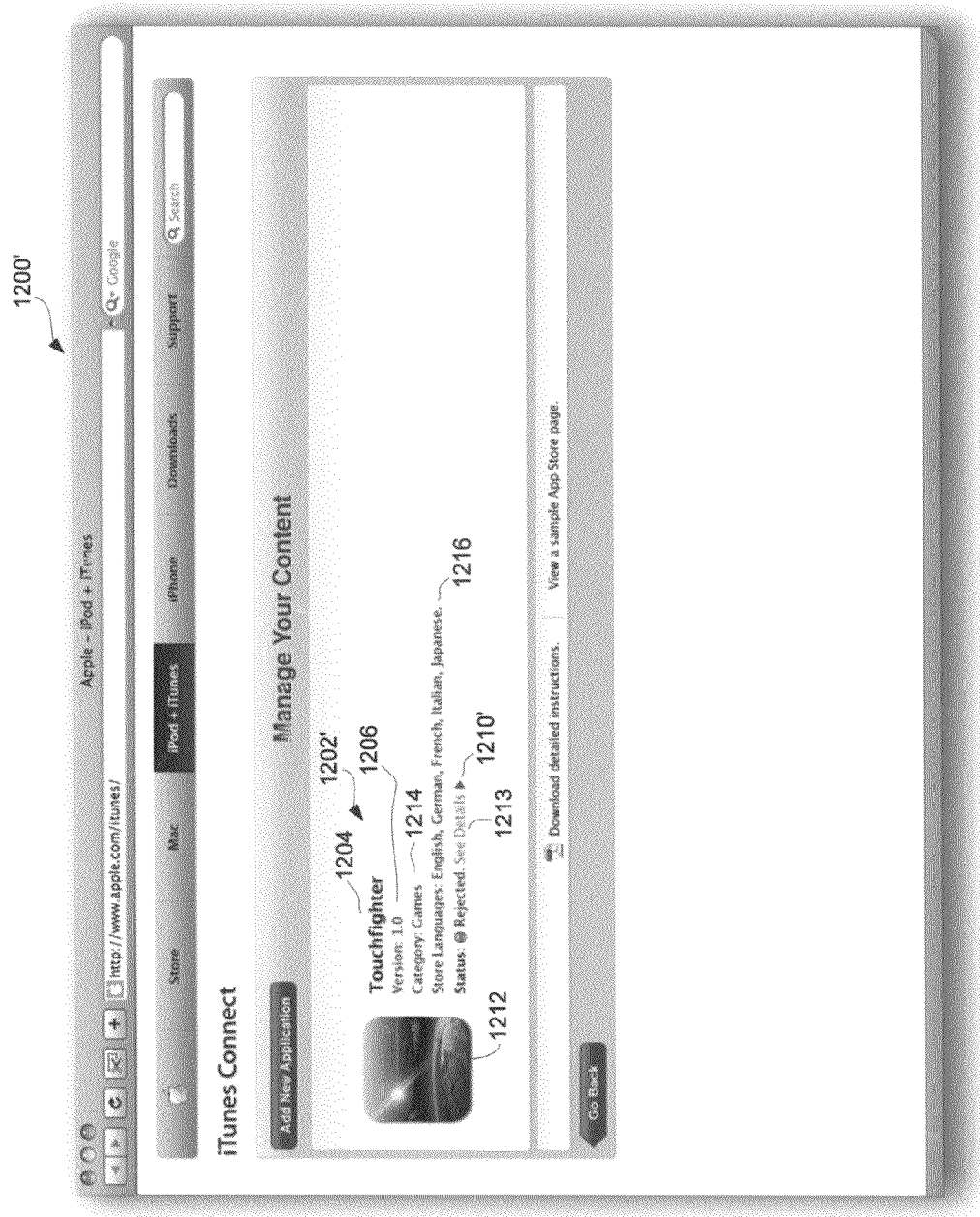

FIG. 12B is a screen shot of a representative product management base page 1200' according to one embodiment of the invention. The product management base page 1200' represents another instance of the product management base page 1200 at another point in time. In particular, the product management base page 1200' can represent a point in time after review of the digital product has been preformed. As illustrated in FIG. 12B, the product designation region 1202 indicates the product name 1204, the product version 1206, the status indication 1210, and the image representation 1212. Here, the status indication 1210' now indicates that the associated digital product has been rejected by the online product distribution site. In one embodiment, a link 1213 can be provided to the user on the product management base page 1200' so that the user can retrieve additional information or assistance with understanding why the submitted digital product was rejected and how the rejection might be overcome. Still further, the product designation region 1202' can also include category information 1214 and supported languages 1216. The category information 1214 results from the genre selections made during the providing of product information, and the supported languages 1216 are those languages that were provided when providing localization information.

Digital products, such as application programs, that are large is size can be submitted using a more efficient network connection. In one embodiment, descriptive information (e.g., metadata) for a digital product can be provided with a browser-based client application (e.g., HTTP protocol), while the large one or more data files for the digital product can be submitted using a client submission application (e.g., SOAP protocol).

One aspect of the invention pertains to a system and method for submitting application programs over a network to a distribution system. For instance, the submitted application program can be purchased and downloaded from a product distribution site (e.g., online store). In accordance with one embodiment, in order to purchase an application program from the online media store, a potential purchaser can search and browse through numerous application programs that are available for purchase. Once purchased, an application program can be downloaded over the network to the purchaser. The file for the application program may then be encrypted for the purchaser's use and stored on the purchaser's machine. Thereafter, the purchaser can make use of the application program (e.g., run the application program). However, the use of the application program can still be limited. For example, the use of the application program might be limited to a single device, or alternatively to only up to a predetermined number user machines can be authorized to use the application program.

In one embodiment, the client submission application can accept an electronic digital product package that identifies and/or includes an application program file for submission to a product submission and management system. Another embodiment relates to submission of a digital product package to the product submission and management system. In one implementation, a digital product package that is submitted to a product submission and distribution system can include an application program file and an unique identifier to locate metadata that provides descriptive and/or management data associated with the application program file.

In accordance with one embodiment, a product distribution site has access to packages that have been submitted to the product submission and management system 104 and stored to the products store 106. In one embodiment, a validation process can validate packages that have been submitted to the product submission and management system 104. For instance, the validation process may check the presence (or absence) of files that are identified in a package, check that various attributes of the package are present, check the values of various attributes of the package, and/or check that extensions of one or more of the identified files are correct.

In accordance with one embodiment, a program developer can submit an application program to the product submission and management system 104 in the form of a package. In such an embodiment, a package including an application program file which can represent an archive file. The package can also include a metadata file. As an example, the metadata file can be an XML file. The metadata file can pertain to administrative data (e.g., identifiers, verifications) and/or metadata data descriptive of the application program. Once the submitted application program is approved for distribution, the application program can be made available for purchase from the product distribution site 102 (e.g., online store).

Figure 13A:
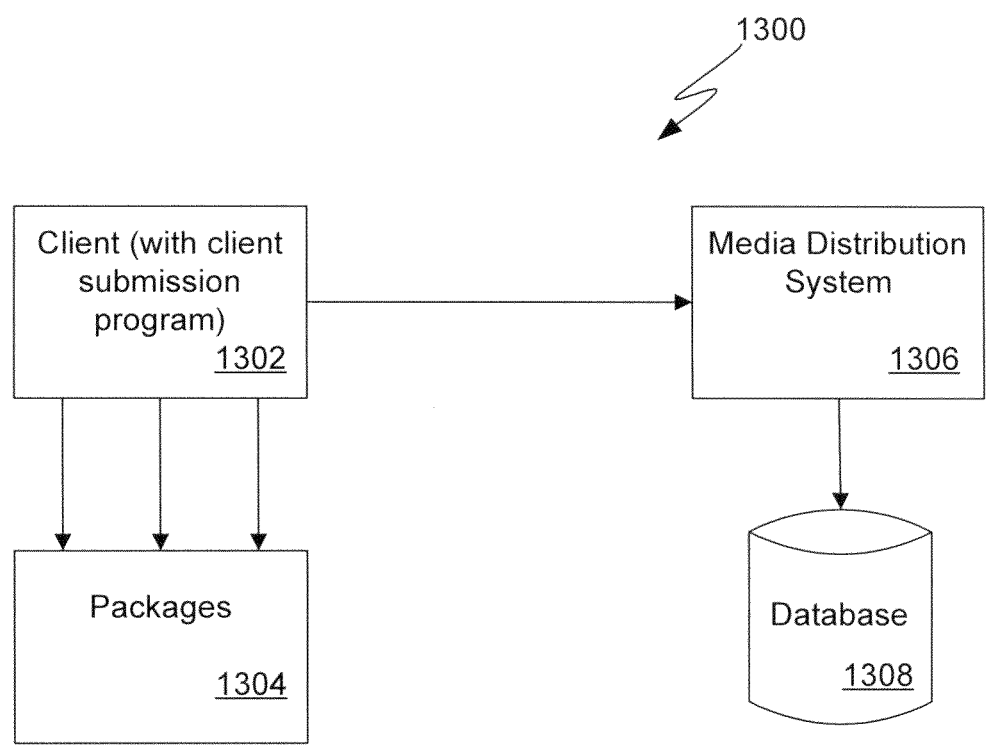
FIG. 13A is a simplified block diagram illustrating an exemplary program submission system supporting submission of a package to a product submission and distribution system.

FIG. 13A is a simplified block diagram illustrating an exemplary program submission system 1300 supporting submission of a package to a product submission and distribution system. The program submission system 1300 supports the submission of an application program. More particularly, a client 1302 can run a specialized submission application supporting the uploading of application programs. The specialized submission application offers better data transfer capabilities than with HTTP protocols. The specialized submission application can also support the validation of the application program and/or media content data prior to submission. Although only the single client 1302 is shown in FIG. 13A, the program submission system 1300 can support a plurality of clients 1302, enabling developers to deliver application program files (and possibly metadata) to the product submission and distribution system 1300 for distribution by a product distribution site.

In one embodiment, client 1302 has access to a set of one or more packages 1304. Client 1302 can submit application program files and possibly metadata associated with one or more packages to a media distribution system 1306. Upon receipt of the program files (and possibly metadata), the media distribution system 1306 can validate the application program files and/or metadata. For instance, the media distribution system 1306 can validate the application program files and/or metadata against a metadata format or package specification. The media distribution system 1306 can store the program files (and possibly metadata) in a database 1308. The media distribution system 1306 can include one or more servers.

In one embodiment, the client 1302 can submit metadata prior to submitting associated application program file. The client 1302 can optionally validate the metadata prior to sending the metadata. When the metadata is received at the product distribution system 1306, the metadata can be validated by the media distribution system 1306. As will be described in further detail below, validation may include checking the metadata against a metadata specification such as that described above. If the metadata is determined not to be valid, the user can be notified that the metadata is not valid. For instance, an error message may indicate a reason that the metadata does not conform with a particular metadata specification. If the metadata is determined to be valid, a notification can indicate that the metadata has been successfully validated. Once a client receives confirmation that metadata has been successfully validated, the client can submit the associated application program file. The client can submit the application program separate from the metadata. Alternatively, the client can submit the application program along with the metadata that has already been submitted. For instance, the client can submit a package including the application program file and associated metadata. The metadata can be submitted prior to its corresponding media content data. Alternatively, metadata can initially be submitted with its corresponding media content data. In either case, media content data can be submitted in a package format such as that described herein.

When the product distribution system receives a package, the product distribution system can determine whether the package is valid. For instance, the product distribution system can determine whether the metadata is valid (e.g., conforms to a metadata specification). If the package is determined not to be valid, the product distribution system can send an error message. If the package is determined to be valid, the product distribution system can accept the package. The package or portion thereof can then be stored to a database.

Figure 13B:
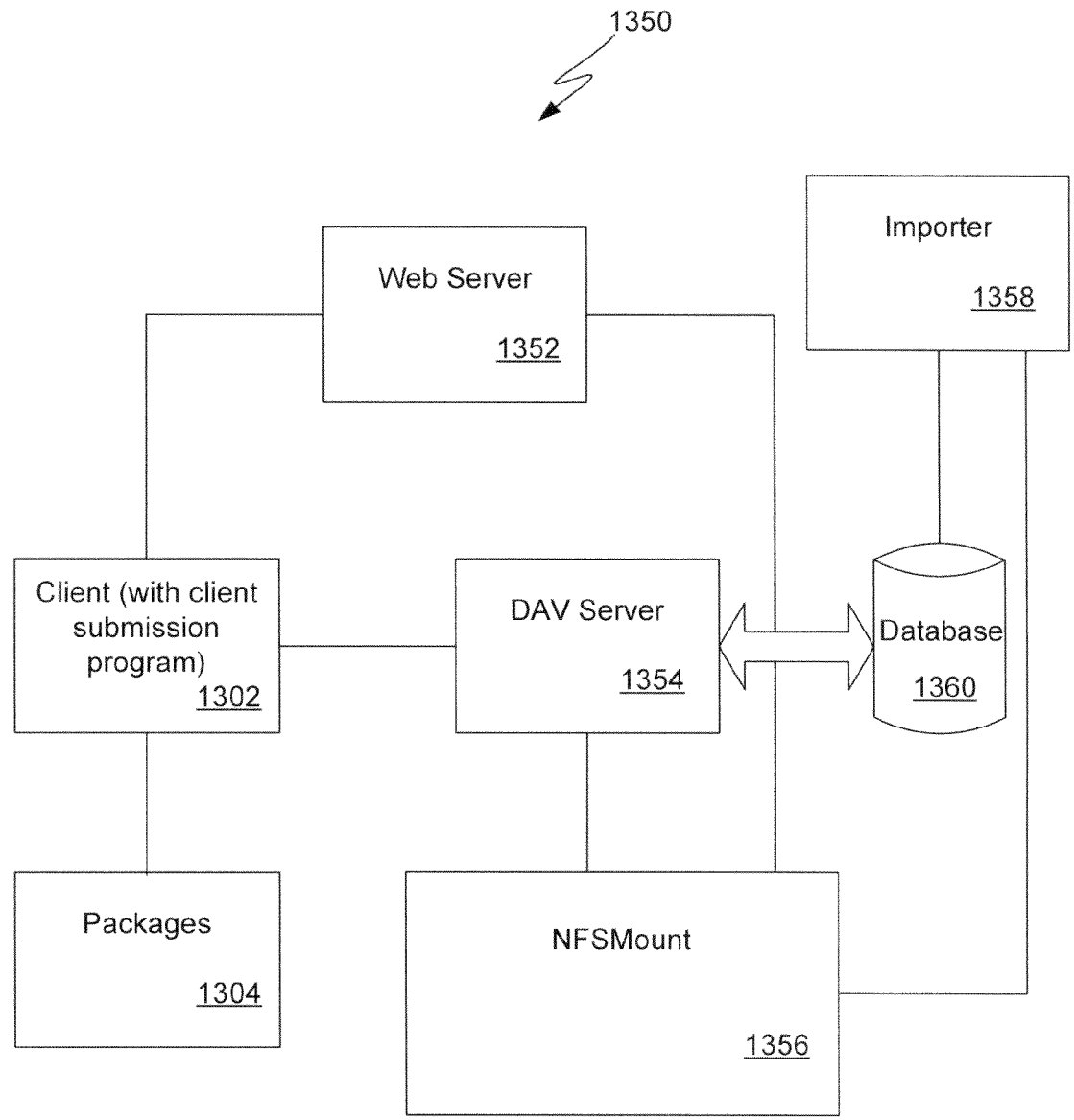
FIG. 13B is a block diagram illustrating an exemplary program submission system supporting submission of a package to a product submission and distribution system.

FIG. 13B is a block diagram illustrating an exemplary program submission system supporting submission 1350 of a package to a product submission and distribution system. The program submission system 1350 supports the submission of an application program. As described above, the client 1302 running a specialized submission program can access and upload the one or more packages 1304. More particularly, the client 1302 can upload metadata and/or media content data. The submission can be accomplished via communication with a Web Server 1352 and/or DAV Server 1354. DAV Server 1354 can operate delivery protocol DAV. Thus, if a network connection fails or a server goes offline, the specialized submission program can resume an upload that was already in progress. The communication between the client 1302 and the Web Server 1352 and/or DAV Server 1354 can be done using Simple Object Access Protocol (SOAP), which provides an open, extensible way for applications to communicate using XML-based messages over the Internet. With loose coupling of SOAP message architecture and WebDAV delivery architecture, the specialized submission program permits another protocol to be implemented instead of DAV. In one embodiment, the specialized submission program is a Java-based command-line tool.

The client 1302 can submit the username, password, content provider identifier, and/or metadata to Web Server 1352. The Web Server 1352 can then authenticate the identity of the content provider, username and/or password. Upon authentication, the Web Server 1352 can validate the metadata. Assuming that the metadata has been successfully validated, the client 1302 can submit the application program file associated with the metadata to the Web Server 1352 and/or DAV Server 1354. More particularly, the application program file can be submitted to the Web Server 1352, which can then provide the application program file to the DAV Server 1104. In one embodiment, client 1302 submits a package including at least the application program file. Optionally, the package can also include metadata pertaining to the application program. Thus, client 1302 can resubmit the previously validated metadata. The client 1302 can validate the package prior to its submission.

Upon submission of metadata and/or media content data, the metadata and/or media content data can be validated. At least a portion of the metadata and/or media content data can be stored to a repository such as a NFSMount 1356. An importer 1358 can retrieve the metadata and/or application program file, or portions thereof. The importer 1108 can store the metadata and/or application program file to a database 1360. Moreover, the importer 1358 can store data associated with the metadata and/or media content data to database 1360. For instance, Importer 1358 can store data such as timestamps associated with metadata and/or media content data that has been submitted.

The client 1302 can also choose to log output information resulting from uploading package(s). Logging preferences can be indicated through the use of various commands or menu selections, for example. For instance, the client 1302 can specify a directory or filename to which output information is to be logged. More specifically, the client 1302 can specify a directory or filename to which successfully uploaded package and/or file information is to be logged. In some embodiments, it is possible to specify a log level indicating an amount of information and/or level of detail of information to be logged. For instance, the client 1302 may wish to receive all error messages. Alternatively, the client 1302 may wish to receive critical level log messages, informational log level messages, and/or detailed log level messages. It is also possible for the user to specify a directory to which successfully uploaded and/or unsuccessfully unloaded packages can be moved after the client submission program completes the upload process. Similarly, it is also possible for the user to specify a directory to which validated packages are to be moved before the client 1302 uploads the packages. It is also possible to remove (e.g., delete) successfully uploaded packages from the source directory after client submission program completes the upload process.

Figure 14A:
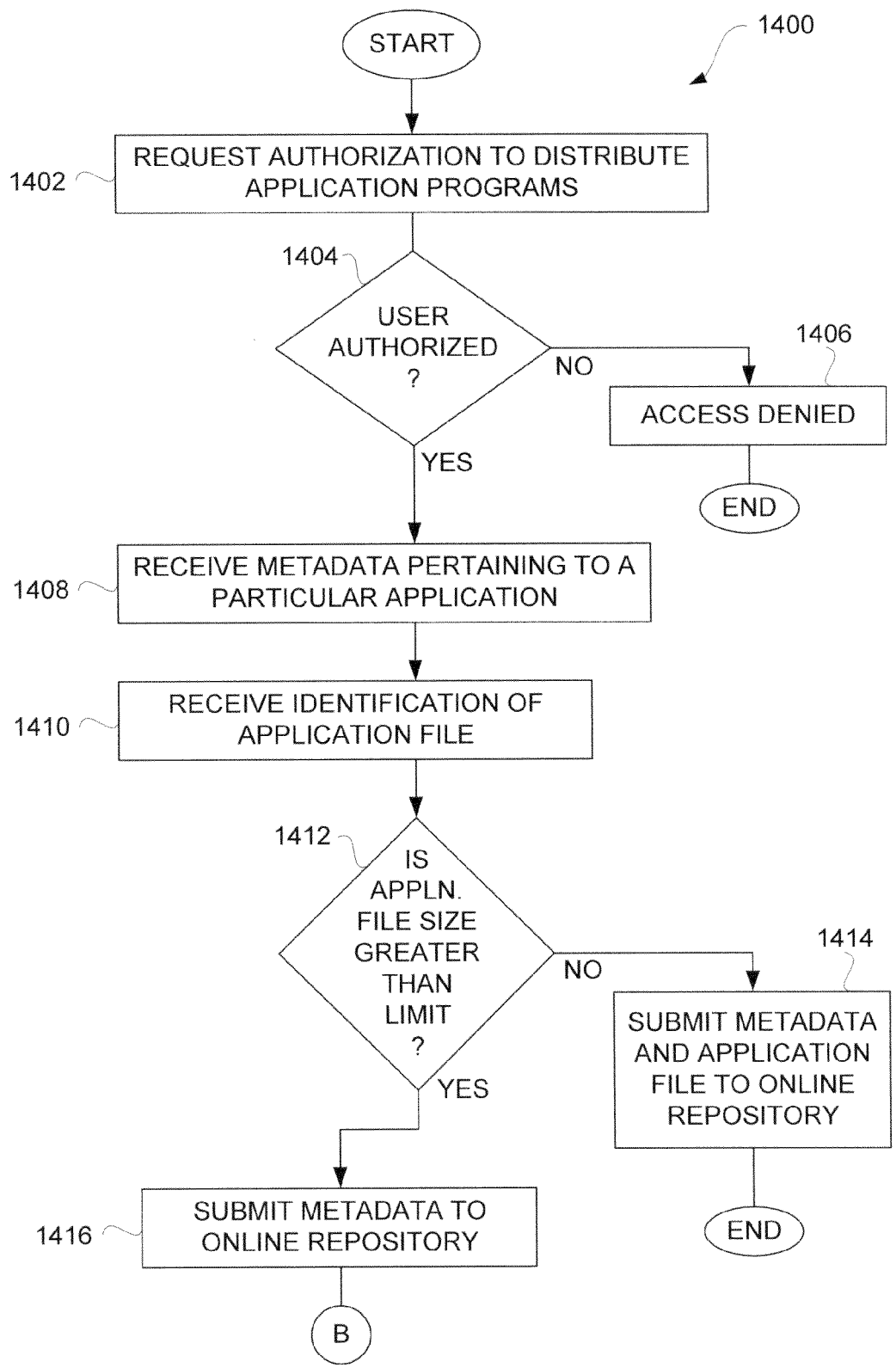
FIGS. 14A and 14B are flow diagrams of a program submission process according to one embodiment of the invention.
Figure 14B:
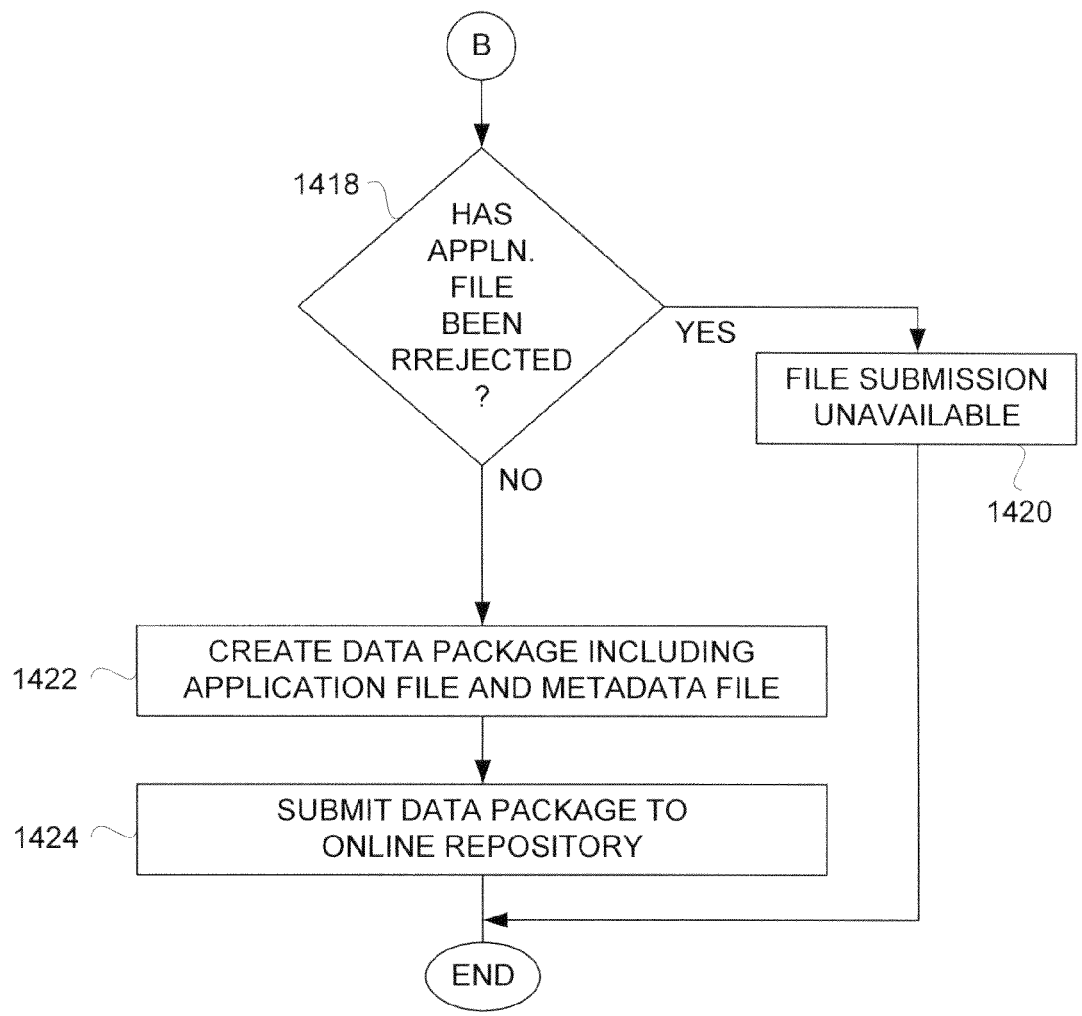

FIGS. 14A and 14B are flow diagrams of a program submission process 1400 according to one embodiment of the invention. The program submission process 1400 can be performed by, for or with a system supporting product submission system, such as the product submission and distribution system 100 illustrated in FIG. 1.

The program submission process 1400 can request 1402 authorization of a user to distribute application programs. Here, the request can be processed by a product submission and management system. The distribution of application programs can be by a product distribution site, such as the product distribution site 102 illustrated in FIG. 1. The user is typically a developer of application programs. In one embodiment, a user can be previously authorized to distribute application programs, such as by entering into a distribution agreement with the product distribution site.

A decision 1404 can determine whether the user (developer) is authorized to distribute application programs. When the decision 1404 determines that the user is not authorized to distribute application programs through the product distribution site, access to the product submission system is denied 1406. Following block 1406, the program summation process 1400 can end.

Alternatively, when the decision 1404 determines that the user is authorized to distribute application programs through the product distribution site, metadata pertaining to a particular application can be received 1408. In one implementation, the user can provide the metadata pertaining to the particular application. For example, a form can be display and the user can complete the form by entering metadata. An identification of a particular application file can also be received 1410. The particular application file is the application file for the application program being submitted.

After the particular application file has been identified, a decision 1412 can then determine whether the file size for the particular application file is greater than a predetermined limit. For example, in one implementation, the predetermined limit can be 200 megabytes (MB). When the decision 1412 determines that the file size for the particular application file is not greater than the predetermined limit, the metadata and the particular application file can be submitted 1414 to an online repository. The product submission system can be considered part of the online repository. Following block 1414, the program submission process 1400 can end with the application program having been successfully submitted. On the other hand, when the decision 1412 determines that the file size for the particular application file is greater than the predetermined limit, then the metadata is submitted 1416 to the online repository. Here, in this situation, the application file is not submitted to the online repository because the file size of the application file is greater than the predetermined limit. It should be noted that the submission operations of blocks 1414 and 1416 are, for example, performed over network connections using HTTP protocol. However, since the HTTP protocol is cumbersome for submission of large data files, larger application files are not submitted at block 1416.

Following the submission 1416 of the metadata, a decision 1418 can determine whether the application file has been previously rejected by the product submission system. When the decision 1418 determines that the application file has been previously rejected, submission of the application file is unavailable 1420. Here, users can be prevented from resubmitting an application file that has already been rejected. Alternatively, when the decision 1418 determines that the application file has not been previously rejected, a data package including the application file and a metadata file can be created 1422. The metadata file can, for example, include a unique identifier for the corresponding application program as well as a signature (cryptographic signature, such as using MD5). Although no necessary, the metadata file could also include metadata pertaining to the particular application program. Next, the data package can be submitted 1424 to the online repository. Following block 1424, the program summation process 1400 can end.

Figure 15A:
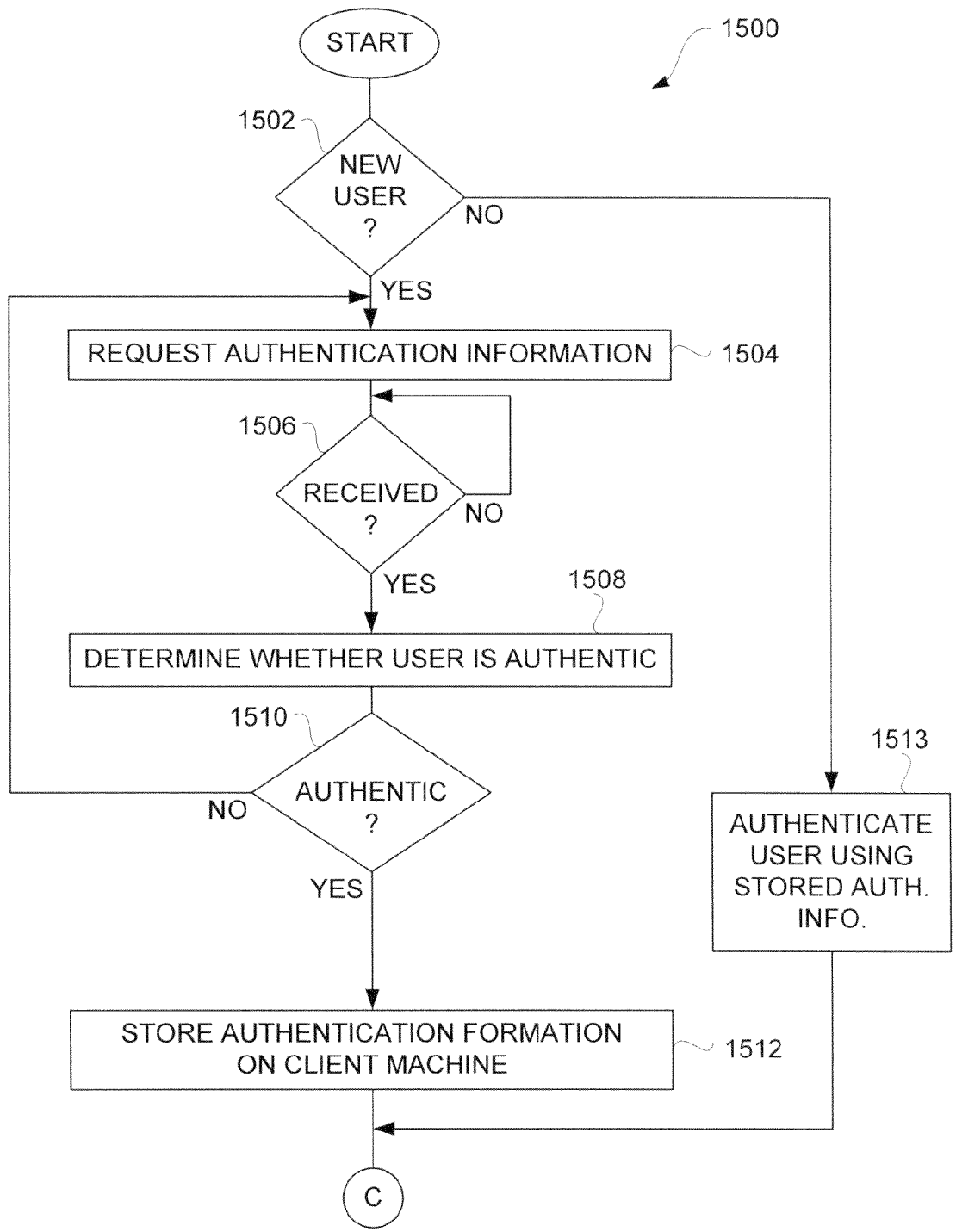
FIGS. 15A-15C are flow diagrams of a client-side submission process according to one embodiment of the invention.
Figure 15B:
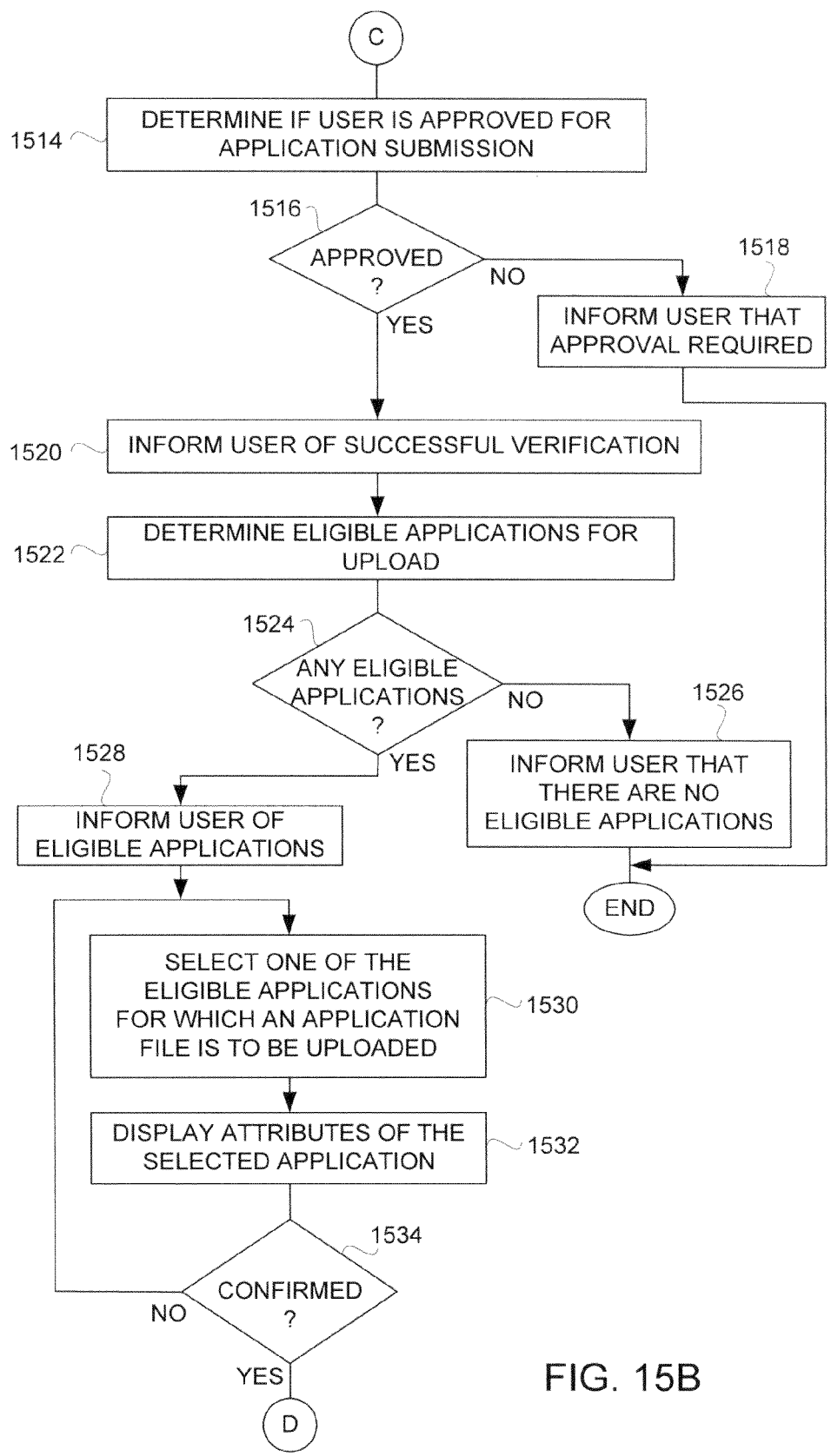
Figure 15C:
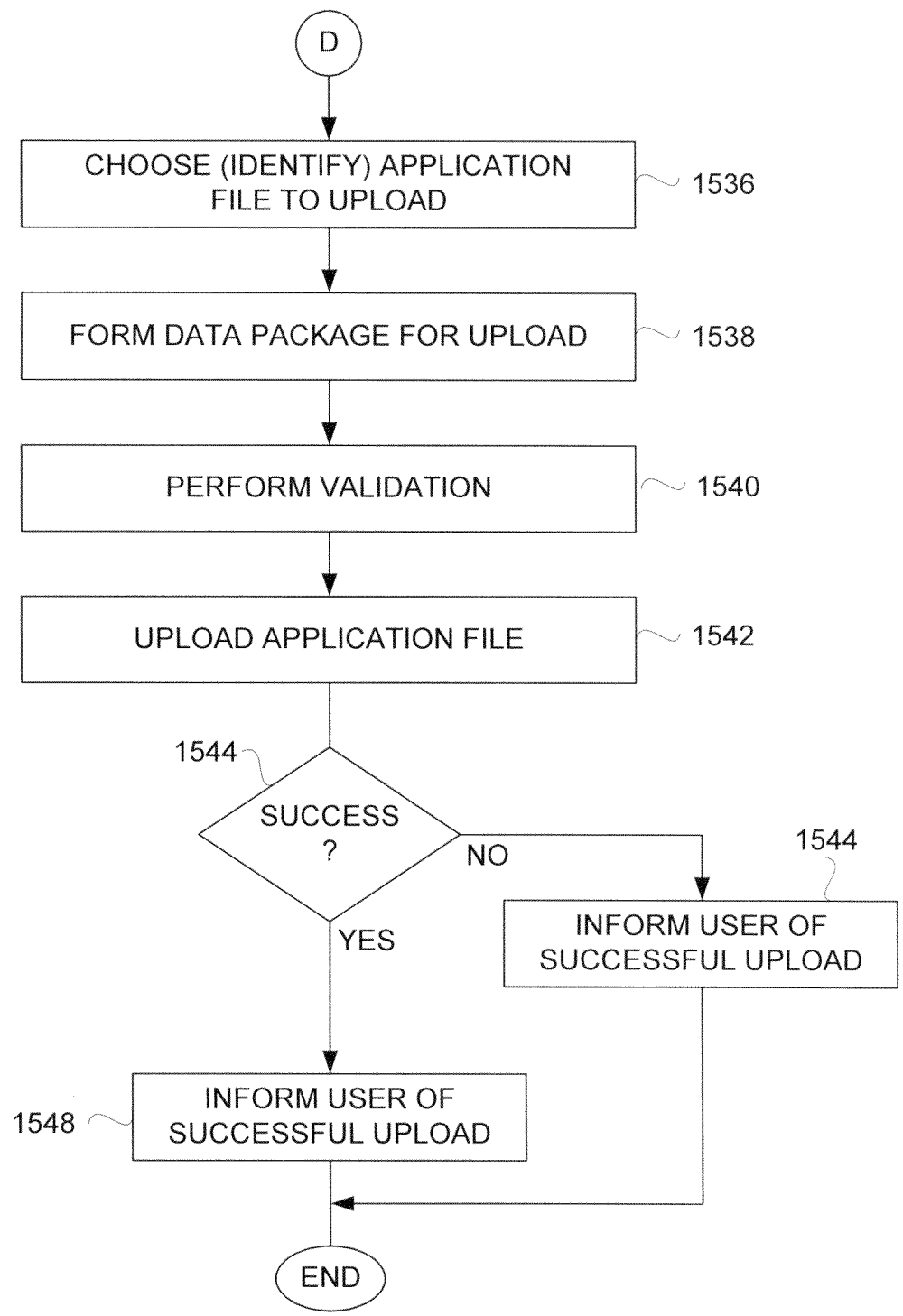

FIGS. 15A-15C are flow diagrams of a client-side submission process 1500 according to one embodiment of the invention. The client-side submission process 1510, for example, by performed by a product submission program or a specialized submission program as discussed above.

The client-side submission process 1500 can began with a decision 1502 that determines whether a requesting user that requests to submit an application program is a new user. When the decision 1502 determines that the requesting user is a new user, authentication information can be requested 1504. The user can then provide the requested authentication information, such as user identifier and password, at a client machine. A decision 1506 can determine whether the requested authentication information has been received. When the decision 1506 determines that the requested authentication information has not yet been received, the client-side submission process 1500 awaits the authentication information. Once the decision 1506 determines that the requested authentication information has been received, the client-site submission process 1500 can determine 1508 whether the requesting user is authentic. When the decision 1510 determines that the requesting user is not authentic, the client-site submission process 1500 can return to repeat block 1504 so that the requesting user can re-attempt to authenticate themselves. In an alternative embodiment, the client-side submission process 1500 could end if the decision 1510 determines that the requesting user is not authentic. On the other hand, when the decision 1510 determines that the requesting user is authentic, authentication information can be stored 1512 on the client machine associated with the requesting user. Also, following the decision 1502 when the requesting user is not a new user, the requesting user can be authenticated 1513 using previously stored information (such as authentication information stored at block 1512).

Following block 1512 or 1513, it can be determined 1514 whether the requesting user is approved for application submission. As previously noted, in order for a user to be approved for application submission, prior registration and/or qualifications need to be performed. As an example, the requesting user can be required to enter into a distribution agreement with a product distribution site for distribution of application programs. A decision 1516 can determine whether the requesting user is approved for application submission. When the decision 1516 determines that the requesting user is not approved, the user is informed 1518 that they are currently not approved for application submission and thus approval must first be obtained. For example, the user is required to obtain contract approval before application submission can be performed. Following block 1518, the client-site submission process 1500 can end.

On the other hand, when the decision 1516 determines that the requesting user is approved for application submission, the user can be informed 1520 that their usage has been successfully approved. Next, one or more eligible applications for upload can be determined 1522 for the requesting user. A decision 1524 can determine whether there are any eligible applications. In one embodiment, the eligible application are those application programs for which metadata has already been submitted (but not the application file), such as in block 1416. When the decision 1524 determines that there are no eligible applications for the requesting user, the requesting user can be informed 1526 that there are no eligible applications. Following block 1526, the client-side submission process 1500 can end.

Alternatively, when the decision 1524 determines that there are eligible applications for the requesting user, the user can be informed 1528 of the one or more eligible applications. Next, the requesting user can select 1530 one of the one or more eligible applications for which an application file is to be uploaded. The attributes of the selected application can then be displayed 1532. The display 1532 of the attributes of the selected application permits the requesting user to verify or confirm that the application identified by the displayed attributes is indeed the desired application for which the user desires to submit an application program file. Hence, a decision 1534 can determine whether the requesting user has confirmed the displayed attributes as the appropriate application program. When the decision 1534 determines that the requesting user has not confirmed the displayed attributes as being the appropriate application program, the client-side submission process 1510 permits in the requesting user to repeat block 1530 and subsequent blocks. Alternatively, when the decision 1534 determines that the requesting user has confirmed the displayed attributes as being the appropriate application program, an application file to be uploaded can be chosen (or identified) 1536. A data package for upload can then be formed 1538. The data package include at least the application file in a compressed format, such as a ZIP file. The ZIP file format is a popular lossless data compression and archival format. A ZIP file can contain one or more files that have been compressed. The data package can also include a metadata file that includes at least a unique identifier for the application program and a digital signature for the application file being submitted. In addition, validation can be performed 1540 for any aspect of the application submission.

The client-side submission process 1500 can then operate to upload 1542 the application file. According to the embodiment illustrated in FIGS. 15A-15C, the upload 1542 of the application file can be performed by uploading the data package that has been formed 1538. Next, a decision 1544 can determine whether the application file (or package) has been successfully uploaded 1542. When the decision 1544 determines that the upload 1542 has not been successful, the requesting user is informed 1546 of the unsuccessful upload. Alternatively, when the decision 1544 determines that the upload 1542 of the application file (or data package) has been successful, the requesting user can be informed 1548 of the successful upload. Following block 1546 or 1548, the client-side submission process 1500 can end.

Figure 16A:
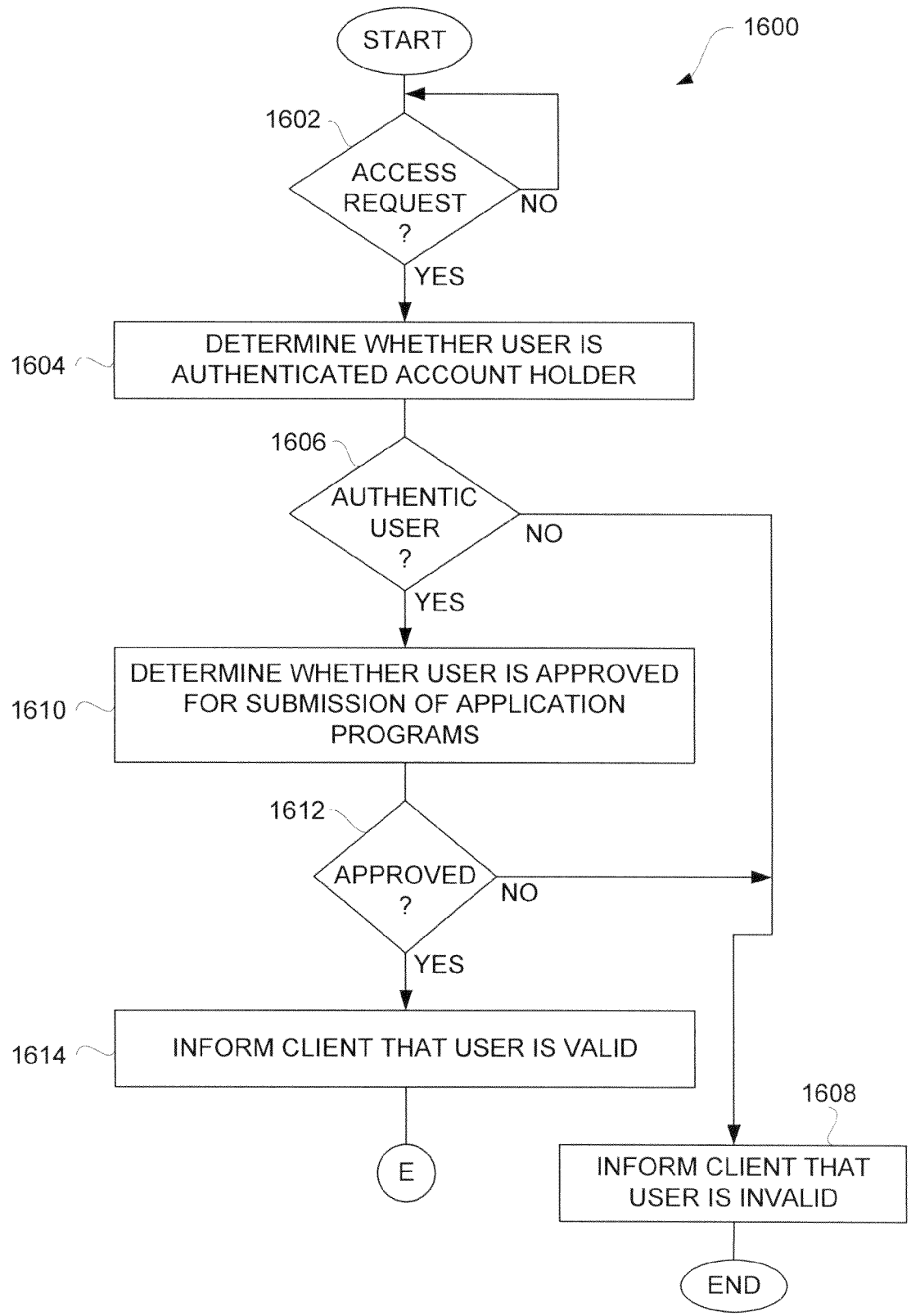
FIGS. 16A and 16B are flow diagrams of a server-side summation process according to one embodiment of the invention.
Figure 16B:
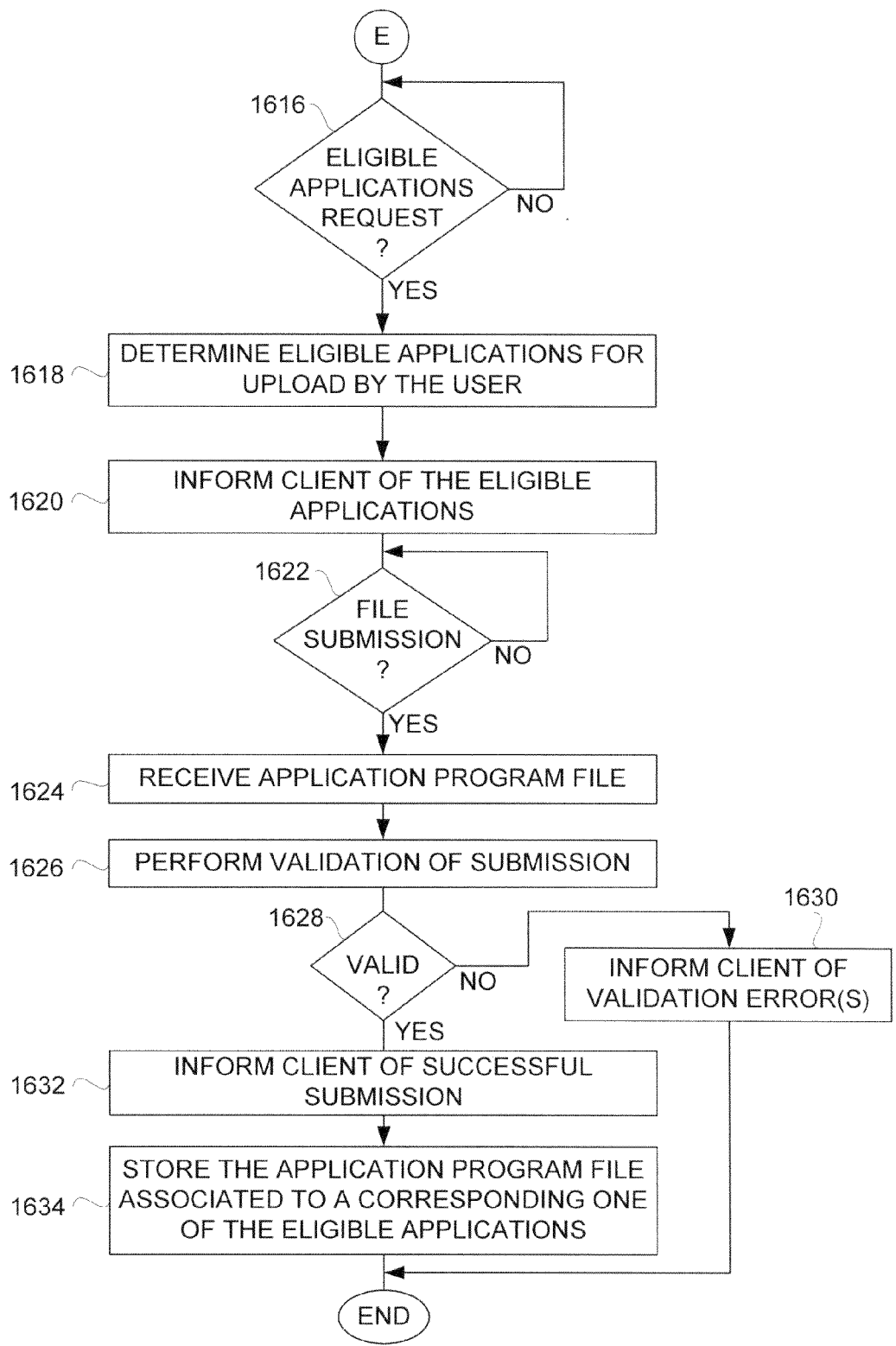

FIGS. 16A and 16B are flow diagrams of a server-side summation process 1600 according to one embodiment of the invention. The server-side submission process 1600 is, for example, performed by a server computer. The server computer can implement a product submission system, such as the products submission and management system 104 illustrated in FIG. 1.

The server-side submission process 1600 can begin with a decision 1602 that can determine whether an access request has been received. Here, the server-side submission process 1600 can be considered to be invoked once an access request has been received from a client computer (or client machine). Hence, when the decision 1602 determines that an access request has not been received, the server-side submission process 1600 can await such a request. Once the decision 1602 determines that an excess request has been received, the server-side submission process 1600 can determine 1604 whether the user is an authenticated account holder. A decision 1606 can determine whether the user is an authentic user (authentic account holder). When the decision 1606 determines that the user is not an authentic user, the client can be informed 1608 that the user is invalid. Following block 1608, the server-side submission process 1600 can end since the user has not been authenticated.

Alternatively, when the decision 1606 determines that the user is an authentic user, the server-side submission process 1600 can determine 1610 whether the user is approved for submission of application programs. In one implementation, using the user account associated with the user, the product submission system can access a database to determine whether the user has been approved for submission of application programs. While the user might be approved for submission of other types of content, in one implementation, the product submission system determines approval for a particular type of data, namely, application programs. A decision 1612 can then determine whether the user is approved for submission of application programs. When the decision 1612 determines that the user is not approved for submission of application programs, the client can be informed 1608 that the user is invalid and then the server-side submission process 1600 can end. On the other hand, when the decision 1612 determines that the user is approved for submission of application programs, the client can be informed 1614 that the user is valid and authorized to proceed with submission of an application program.

Next, a decision 1616 can determine whether an eligible applications request has been received. When the decision 1616 determines that an eligible applications request has not yet been received, the server-side submission process 1600 can await such a request. Once the decision 1616 determines that an eligible applications request has been received, eligible applications for upload by the user can be determined 1618. For example, the product submission and management system 104 can denote application programs as "awaiting application upload" when the programs have had their metadata submitted but not the application program file. The client can then be informed 1620 of the eligible applications.

A decision 1622 can then determine whether a file submission has been received. When the decision 1622 determines that a file submission has not been received, the server-side submission process 1600 can await a file submission. On the other hand, when the decision 1622 determines that a file submission has been received, an application program file can be received 1624. Validation of the submission can then be performed 1626.

Here, server-side processing can be performed to validate the submission of the application program file prior to its being received/accepted by the product submission system. The validation processing performed 1626 can vary with implementation. For example, some validations that can be performed are as follows. The data package can be validated, such as validating that a valid ZIP file is present in the data package (e.g., function, unzOpen( ), returns success if the ZIP file is valid). Presence of an icon in the ZIP file within the data package can be validated. As an example, the validation processing can open the ZIP file, extract the Info.plist file, instantiate the plist, and extract the value for the icon key. If an icon is specified, the validation determines whether specified filename is a file within the ZIP file. If a filename is not specified, the validation determines whether default a file name (e.g., "Icon.png" or "icon.png") is within the ZIP file. Another validation is that a the top level directory of the ZIP file is denoted "Payload". Still another validation is a codesign verification. Developers can be required to digitally "sign" their applications with a cryptographic key to verify the integrity of their applications. Every file must be accounted for and have the correct attributes in the signed result. To validate that the application is signed, we unzip the ZIP file into a temporary directory, then execute a codesign check on the executable file (application program file) using a codesign verifier, such as the codesign verifier from the Apple SOAP service.

Next, a decision 1628 can determine whether the submission is valid. When the decision 1628 determines that the submission is not valid, the client can be informed 1630 of the validation error. Alternatively, when the decision 1628 determines that the submission is valid, the client can be informed 1632 of the successful submission. Thereafter, the application program file can be stored 1634 associated to a corresponding one on the eligible applications. In other words, the application program file that has been uploaded is stored in a storage device, such as a database or other data structure associated with the product submission system, such that it is linked to the corresponding eligible application. As an example, for a given application program, such linking serves to associate the application program file with previously submitted metadata for the application program. Following block 1630 or 1634, the server-side sedition process 1600 can end.

This application also references and/or incorporates: (1) U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION", which is hereby incorporated herein by reference; (2) U.S. patent application Ser. No. 11/712,303, filed Feb. 27, 2007, and entitled "PROCESSING OF METADATA CONTENT AND MEDIA CONTENT RECEIVED BY A MEDIA DISTRIBUTION SYSTEM", which is hereby incorporated herein by reference; (3) U.S. patent application Ser. No. 11/609,815, filed Dec. 12, 2006, and entitled "TECHNIQUES AND SYSTEMS FOR ELECTRONIC SUBMISSION OF MEDIA FOR NETWORK-BASED DISTRIBUTION", which is hereby incorporated herein by reference; (4) U.S. patent application Ser. No. 11/622,923, filed Jan. 12, 2007, and entitled "COMPUTERIZED MANAGEMENT OF MEDIA DISTRIBUTION AGREEMENTS", which is hereby incorporated herein by reference; and (5) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of certain embodiments of the invention is that submission of digital products, such as computer programs (applications), to online distribution sites can be achieved by numerous persons (e.g., developers) with uniformity. The uniformity facilitates processing, approving and distributing the computer programs by representatives of the online distribution sites to process the digital product. Another advantage of certain embodiments of the invention is that digital product submissions can be user-controlled through information/authorizations provided with submission of digital products to online distribution sites. Still another advantage of certain embodiments of the invention is that users can gain online access to status information of digital product submission. Yet still another advantage of certain embodiments of the invention is that large digital products (e.g., applications) can be efficiently and conveniently submitted to an online distribution site.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for submitting an application program from a client computer to an online repository, said method comprising:
    authenticating a user;
    determining that the user is approved for submission of application programs to the online repository, the determining being based on existence of a distribution agreement associated with the online repository and the user;
    prior to receiving a submission of an application program file from the client computer for upload to the online repository:
        receiving descriptive information metadata corresponding to one or more application programs associated with the user rather than a full application program file for each application program in the one or more application programs when the client computer has determined that the full application program file exceeds a size limit;
        determining, based on the previously received descriptive information metadata, whether there is at least one eligible application program for upload by the user to the online repository provided that the user has been authenticated and approved for submission of application programs; and
    subsequently to receiving the descriptive information metadata and after determining that at least one application program is eligible for upload, receiving a submission of a full application program file from the client computer for a selected one or more of the at least one eligible application program.

2. A method as recited in claim 1, wherein said receiving of the submission comprises receiving an upload of the application program file over a non-HTTP connection.

3. A method as recited in claim 1, wherein said determining if the user is approved for submission of application programs to the online repository comprises accessing a database associated with the online repository to determine whether the user has a contractual agreement with the online repository to distribute application programs.

4. A method as recited in claim 1, wherein said determining whether there are any eligible application programs for upload comprises accessing a database associated with the online repository to determine whether there are any application programs associated with the user that are awaiting an upload of an application program file.

5. A method as recited in claim 4, wherein the database at the time of said accessing stores metadata for the eligible application programs but does not store or link to any application program files for the eligible application programs.

6. A method as recited in claim 1, wherein the application program file being submitted is stored for the online repository so as to be linked to descriptive information metadata for the corresponding eligible application program.

7. A method as recited in claim 6, wherein said receiving of the submission comprises receiving an upload of the application program file over a non-HTTP connection, and wherein said determining if the user is approved for submission of application programs to the online repository comprises accessing a database associated with the online repository to determine whether the user has a contractual agreement with the online repository to distribute application programs.

8. A non-transitory computer readable storage medium including at least executable computer program code tangibly stored thereon for performing a method of submitting an application program from a client computer to an online repository, said method comprising:
    authenticating a user;
    determining that the user is approved for submission of application programs to the online repository, the determining being based on existence of a distribution agreement associated with the online repository and the user;
    prior to receiving a submission of an application program file from the client computer for upload to the online repository:
        receiving descriptive information metadata corresponding to one or more application programs associated with the user rather than a full application program file for each application program in the one or more application programs when the client computer has determined that the full application program exceeds a size limit;
        determining, based on the previously received descriptive information metadata, whether there is at least one eligible application program for upload by the user to the online repository provided that the user has been authenticated and approved for submission of application programs; and
    subsequently to receiving the descriptive information metadata and after determining that at least one application program is eligible for upload, receiving a submission of a full application program file from the client computer for a selected one or more of the at least one eligible application program.

9. A computer readable medium as recited in claim 8, wherein said computer program code for determining if the user is approved for submission of application programs to the online repository comprises computer program code for accessing a database associated with the online repository to determine whether the user has a contractual agreement with the online repository to distribute application programs.

10. A computer readable medium as recited in claim 8, wherein said computer program code for determining whether there are any eligible application programs for upload comprises computer program code for accessing a database associated with the online repository to determine whether there are any application programs associated with the user that are awaiting an upload of an application program file.

11. A computer readable medium as recited in claim 10, wherein, prior to receiving submission of the application program file by said computer program code for receiving a submission of an application program file, the database stores metadata for the eligible application programs but does not store or link to any application program files for the eligible application programs.

12. A computer readable medium as recited in claim 8, wherein the application program file being submitted is stored for the online repository so as to be linked to descriptive information metadata for the corresponding eligible application program.

* * * * *